US012234935B1

(12) United States Patent
Strasser

(10) Patent No.: US 12,234,935 B1
(45) Date of Patent: Feb. 25, 2025

(54) COUPLING JOINT FOR STRUCTURES WITH RECESSED INTERIOR SURFACES

(71) Applicant: James A. Strasser, Cincinnati, OH (US)

(72) Inventor: James A. Strasser, Cincinnati, OH (US)

( * ) Notice: Subject to any disclaimer, the term of this patent is extended or adjusted under 35 U.S.C. 154(b) by 0 days.

(21) Appl. No.: 18/242,778

(22) Filed: Sep. 6, 2023

Related U.S. Application Data

(63) Continuation of application No. 16/431,812, filed on Jun. 5, 2019, now abandoned.

(60) Provisional application No. 62/760,230, filed on Nov. 13, 2018, provisional application No. 62/681,355, filed on Jun. 6, 2018.

(51) Int. Cl.
| | | |
|---|---|---|
| *F16L 37/02* | (2006.01) | |
| *A01G 17/06* | (2006.01) | |
| *E04B 1/58* | (2006.01) | |
| *F16B 7/04* | (2006.01) | |

(52) U.S. Cl.
CPC ............. *F16L 37/02* (2013.01); *A01G 17/06* (2013.01); *E04B 1/585* (2013.01); *F16B 7/044* (2013.01); *Y10T 403/342* (2015.01)

(58) Field of Classification Search
CPC .............. Y10T 403/34; Y10T 403/341; Y10T 403/342; Y10T 403/343; Y10T 403/344; Y10T 403/345; Y10T 403/347; Y10T 403/348; Y10T 403/349; Y10T 403/44; Y10T 403/443; Y10T 403/447; F16B 7/044; F16B 7/0446; A01G 9/12
See application file for complete search history.

(56) References Cited

U.S. PATENT DOCUMENTS

| | | | |
|---|---|---|---|
| 102,443 A | 4/1870 | Smith | |
| 186,351 A | 1/1877 | Leland | |
| 2,546,979 A | 4/1951 | Cozzone | |
| 3,632,147 A | 1/1972 | Finger | |
| 3,716,259 A * | 2/1973 | Weill | ................ B29C 66/12441 403/217 |
| 3,851,980 A | 12/1974 | Worth | |
| 3,864,051 A | 2/1975 | Reid | |

(Continued)

FOREIGN PATENT DOCUMENTS

| | | | |
|---|---|---|---|
| CH | 469466 A | * | 3/1969 |
| DE | 2403832 A1 | * | 8/1978 |

*Primary Examiner* — Jonathan P Masinick
(74) *Attorney, Agent, or Firm* — Frost Brown Todd LLP

(57) ABSTRACT

A kit for forming a garden structure, includes connecting bodies and connecting joints. The connecting bodies include a first connecting body having a first open end, a second connecting body having a second open end, and a third connecting body extending between a third open end and a fourth open end. The connecting joints include a first connecting joint and a second connecting joint. The first connecting joint includes a first base, a first extending body dimensioned to fit with the first open end of the first connecting body and a second extending body dimensioned to fit within the third open end of the third connecting body. The second connecting joint include a second base, a third extending body dimensioned to fit within the second open end of the second connecting body, and a fourth extending body dimensioned to fit within the fourth open end of the third connecting body.

19 Claims, 16 Drawing Sheets

(56) References Cited

U.S. PATENT DOCUMENTS

| | | | |
|---|---|---|---|
| 3,881,830 A * | 5/1975 | Kato | F16B 7/0446 |
| | | | 403/171 |
| 3,883,257 A * | 5/1975 | Delafield | A47B 47/0008 |
| | | | 403/295 |
| 4,516,376 A * | 5/1985 | King | F16B 12/36 |
| | | | 403/171 |
| 4,679,961 A | 7/1987 | Steward | |
| 5,230,197 A | 7/1993 | Hart | |
| 5,265,395 A | 11/1993 | Lalvani | |
| 5,590,974 A | 1/1997 | Yang | |
| 5,983,420 A | 11/1999 | Tilley | |
| 6,082,070 A | 7/2000 | Jen | |
| 6,247,869 B1 | 6/2001 | Lichvar | |
| 6,413,004 B1 | 7/2002 | Lin | |
| 8,387,330 B2 * | 3/2013 | Wallner | E04B 1/585 |
| | | | 446/124 |
| 8,671,644 B2 | 3/2014 | Huang | |
| 10,781,838 B2 | 9/2020 | Koepke | |
| 2005/0249547 A1 | 11/2005 | Chang | |
| 2006/0119239 A1 | 6/2006 | Werwick | |
| 2006/0182492 A1 | 8/2006 | Keller | |
| 2006/0291952 A1 | 12/2006 | Wood | |
| 2012/0301215 A1 | 11/2012 | Huang | |
| 2013/0045042 A1 | 2/2013 | Ohlson | |
| 2017/0325415 A1 | 11/2017 | MacDonald | |
| 2017/0356178 A1 * | 12/2017 | Corbett | E04B 1/34315 |
| 2018/0238365 A1 | 8/2018 | Gillatt | |
| 2019/0059240 A1 | 2/2019 | Scott | |
| 2019/0154079 A1 | 5/2019 | Shapiro | |

\* cited by examiner

US 12,234,935 B1

COUPLING JOINT FOR STRUCTURES WITH RECESSED INTERIOR SURFACES

PRIORITY

This application is a continuation of U.S. patent application Ser. No. 16/431,812, which claims the benefit of U.S. Provisional Application No. 62/760,230, entitled "Multi Inner Joint," filed Nov. 13, 2018 and U.S. Provisional Application No. 62/681,355, entitled "Multi-Inner Joint," filed Jun. 6, 2018, the disclosures of which are incorporated by reference herein.

BACKGROUND

Various types of joints are used to couple a plurality of elongated bodies relative to each other at different angles in order to form structures. Some exemplary structures formed from a combination of joints and elongated bodies may include a garden trellis, a fence, a tent, a wall, a roof, an awning, a canopy, a hunting shelter, etc. A garden trellis may be designed to support growing of climbing vegetables such as green beans (pole), lima beans, peas and other climbing plants. In particular, a garden trellis may support such climbing vegetables such that those vegetables may grow vertically upwards on trellis.

Using a garden trellis can be an effective and inexpensive way to grow vegetables in a small space or in a non-traditional garden such as a roof, patio or urban garden. Some advantages of using a trellis include the effective use of space, and easy access to supported plants (i.e. the benefit of not having to always bend over or get on your knees). Growing vegetables on a trellis can produce much higher yields than bush type plants and use much less ground space. Various types of vegetables may be supported by a trellis. For examples, some vegetables that can be trellised are tomatoes, squash, pumpkins, beans, gourds, peppers, eggplants, and many types of melons.

While various kinds of connecting joints have been made and used, it is believed that no one prior to the inventor(s) has made or used the invention described in the appended claims.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1:
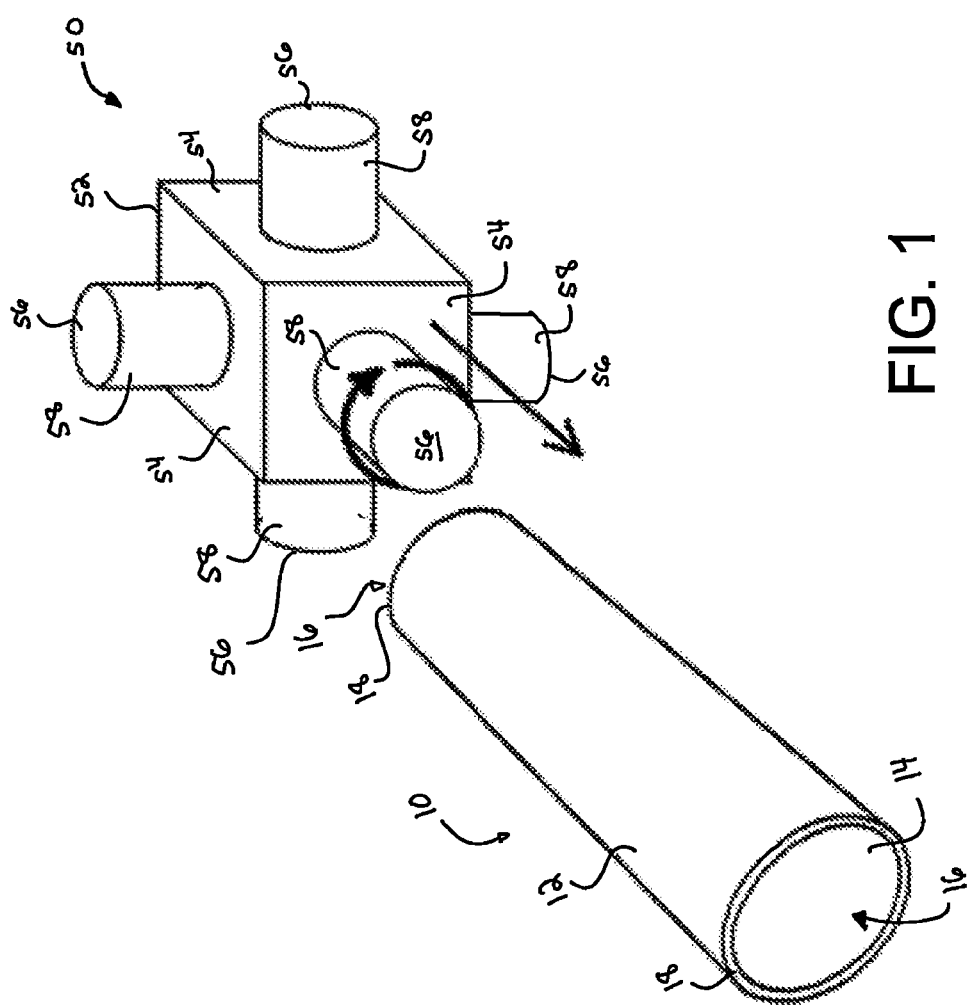
FIG. 1 depicts a perspective view of an exemplary connecting joint and an exemplary connecting body that may be coupled together in order to form a suitable structure.
Figure 3:
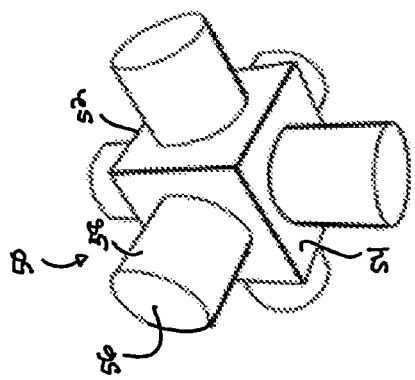
FIG. 3 depicts another perspective view of the connecting joint of FIG. 1.
Figure 4:
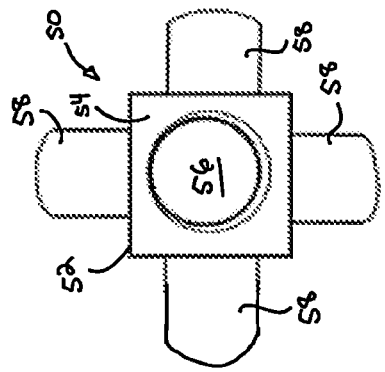
FIG. 4 depicts an elevational front view of the connecting joint of FIG. 1.
Figure 2:
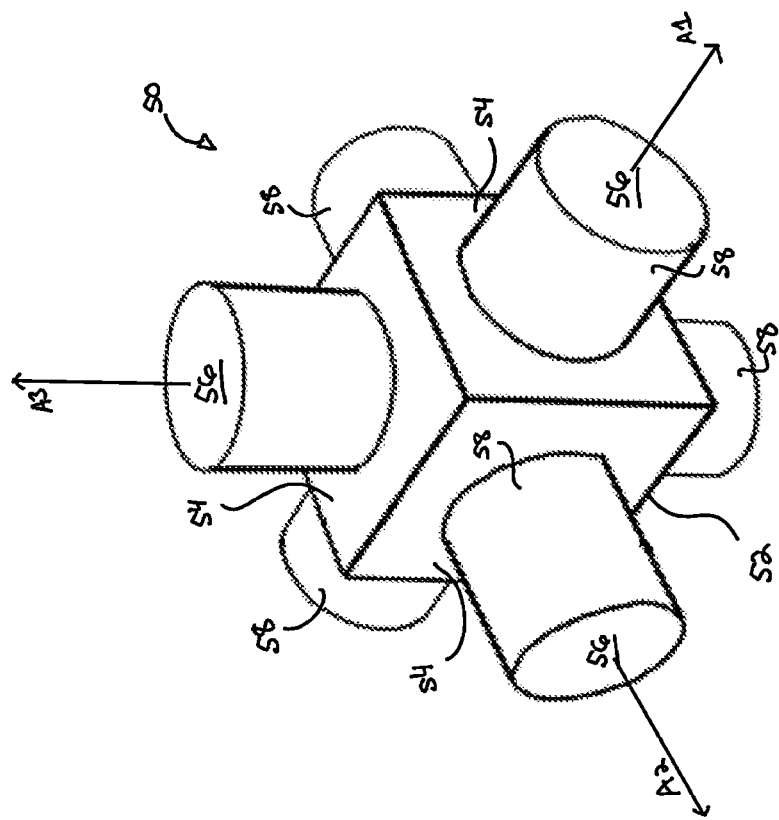
FIG. 2 depicts a perspective view of the connecting joint of FIG. 1.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

I. EXEMPLARY CONNECTING JOINT CONFIGURED TO COUPLE WITH AN INTERIOR PORTION OF A CONNECTING BODY

As mentioned above, various types of connecting joints may be used to couple various types of elongated bodies in order to form structures. In instances where an elongated body defines an interior recess, such as when the elongated body is a tube or a pipe, it may be desirable to use a connecting joint configured to couple with such an elongated body by interacting the inner dimensions of the elongated body rather than the outer dimensions. This action of using the inner dimension to connect pipes, tube, and other hollowed out items may allow for much more flexibility, durability, and functionality in structural, construction, and plumbing usages.

As an example, utilizing a connecting joint to couple with the inner dimensions of an elongated body may allow a person to form the desired structure, without the use of, or with minimal use of, various types of tools (either manual or powered), such as hammers, screw drivers, power drills, air guns, etc. When joints and elongated bodies are operable to couple together without primarily using various tools, a person may more easily form such structures. The ease of forming structures may allow such structures to be assembled for temporary use. Then, once the desired structure is no longer needed, a person may easily disassemble such a structure and pack the associated components into storage until needed again. Alternatively, joints and elongated bodies may be operable to couple together in order to form or add onto more permanent structures, such as a garden trellis.

FIG. 1 shows an exemplary connecting joint (50) (a connecting joint of any type maybe referred to as a Multi Inner Joint (MIJ)), that may be utilized to couple various connecting bodies (10) in order to form a suitable structure. Connecting body (10) of the current example resembles a hollowed-out tube formed from any suitable material or combination of materials as would be apparent to one skilled in the art in view of the teachings herein. For instance, connecting body (10) may be formed from a suitable plastic, metal, wood, resin, other material, etc.

Connecting body (10) includes a cylindrical outer surface (12), a cylindrical inner surface (14), and a pair of annular faces (18). Inner surface (14) and a respective annular face (18) together define a respective open end (16) located on each end of connecting body (10). As will be described in greater detail below, open ends (16) are dimensioned to receive a suitable outwardly protruding body (58) of connecting joint (50), such as a nipple, in order to couple connecting body (10) with connecting joint (50) to form a suitable structure.

Figure 15:
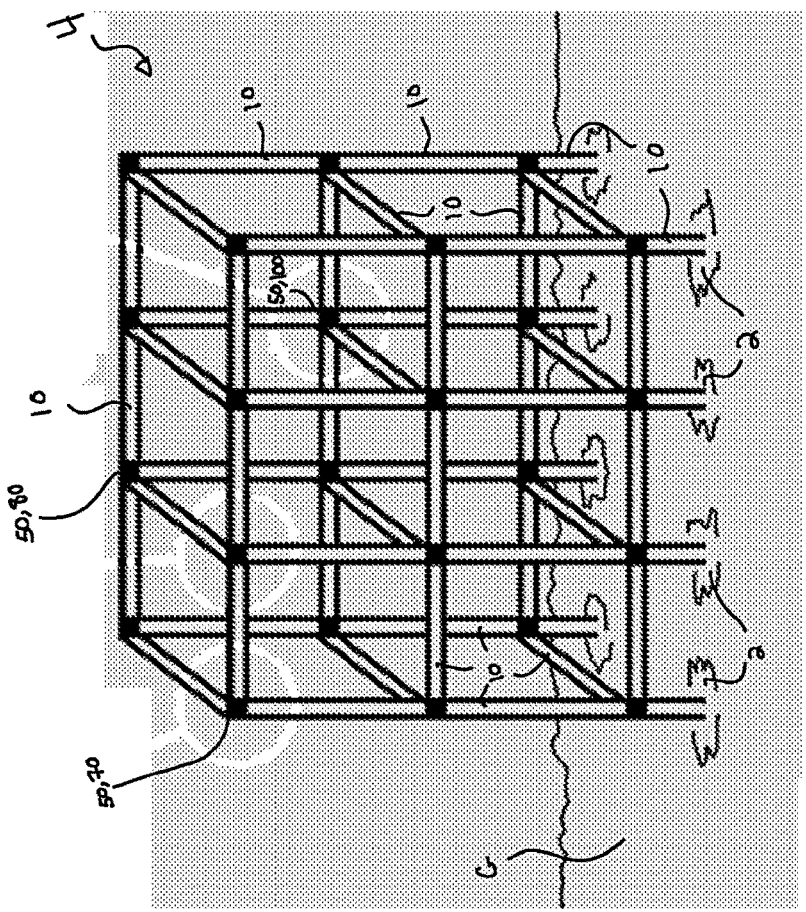
FIG. 15 depicts a perspective view of an exemplary structure that may be formed with a plurality of connecting joints and connecting bodies of FIG. 1.

While in the current example, connecting body (10) is shown with two open ends (16), connecting body (10) may include any suitable number of open ends (16) as would be apparent to one skilled in the art in view of the teachings herein. For example, connecting body (10) may diverge into three, four, five, or more open ends (16). Additionally, connecting body (10) may only have one open end (16) and terminate into another end that is configured to anchor into the ground. An example of this is shown in FIG. 15, where connecting bodies (10) closest to the ground (G) include anchor structures (2) configured to suitably ground respective connecting bodies (10) into the ground (G) to support an exemplary structure (4).

In the current example, connecting body (10) is cylindrical, although this is merely optional. For example, FIG. 22 demonstrates connecting body (10) having a hollow rectangular shape. Connecting body (10) may have any suitable cross-sectional geometry as would be apparent to one skilled in the art in view of the teachings herein. For instance, connecting body (10) may have an oval cross-sectional geometry, a triangular cross-sectional geometry, etc.

Additionally, in the current example, connecting body (10) is hollowed out such that open ends (16) are in fluid communication with each other. In particular, a single inner surface (14) extends between annular faces (18). However, this is merely optional, as connecting body (10) may include interior portions that are not hollow. For example, connecting body (10) may include two inner surfaces (14) isolated from each other and associated with a respective annular face (18). In such an example, each inner surface (14) defines a respective open end (16) that extends a suitable distance away from annular faces (18), which may be dimensioned to suitably accept outwardly protruding body (58) of connecting joint (50).

In some instances, connecting body (10) may be telescoping in nature such that the overall distance between open ends (16) is selectively adjustable. For instance, a locking member may be coupled to telescoping portions of connecting body (10) such that a user may adjust the length of connecting body (10) in an unlocked configuration, and then fix the length of connecting body (10) is a locked configuration.

As best seen in FIGS. 1-4, exemplary connecting joint (50) includes a base (52) and a plurality of outwardly protruding bodies (58) (which may be referred to as nipples). Base (52) includes a plurality of planar exterior surfaces (54), each having an outwardly protruding body (58) extending from a respective surface (54). Each outwardly protruding body (58) terminates into a terminating face (56). Outwardly extending bodies (58) may be centered relative to the corresponding planar exterior surface (54), although this is merely optional.

Outwardly protruding bodies (58) extend along a respective axis (A1, A2, A3). In the current example, axis (A1, A2, A3) are orthogonal relative to each other, although this is merely optional. Additionally, in the current example, each axis (A1, A2, A3) is orthogonal to its respective planar exterior surface (54), although this is also merely optional. In the current example, connecting joint (50) has six outwardly protruding bodies (58). A pair of each outwardly protruding bodies (58) extends along the same axis (A1, A2, A3) in opposite directions. This placement of outwardly protruding bodies (58) may allow a user to easily form a custom structure by coupling a suitable number of connecting bodies (10), in any suitable orientation, with connecting joint (50) in accordance with the description herein.

As mentioned above, outwardly protruding bodies (58) are dimensioned to fit within open ends (16) of connecting bodies (10). In particular, each outwardly protruding body (58) may fit within an open end (16) of a different connecting body (10) in order to couple connecting bodies (10) relative to each other via connecting joint (50), thereby forming a suitable structure. It should be understood that when connecting bodies (10) are suitably coupled with connecting joints (50), connecting bodies (10) will extend lengthwise along a respective axis (A1, A2, A3), which may therefore determine the overall shape formed by connecting bodies (10) and connecting joints (50) when suitably coupled. Each outwardly protruding body (58) may be uniform. Alternatively, outwardly protruding bodies (58) may have varying dimensions in order to suitably couple with various dimensioned inner surfaces (14).

Outwardly protruding body (58) may extend a suitable distance away from respective surface (54) (i.e., have a suitable length or dimension along a respective axis (A1, A2, A3) such that outwardly protruding body (58) suitably couples connecting joint (50) with connecting body (10) when outwardly protruding body (58) is suitably inserted within open end (16). When suitably coupled, outwardly protruding body (58) may suitably transfer external loads/weight from connecting body (10) to base (52). Base (52) may then transfer such loads through various suitable structures, such as the ground (G), other connecting bodies (10), and/or joints (50). Outwardly protruding body (58) may have suitable distance and dimension as would be apparent to one skilled in the art in view of the teachings herein.

Outwardly protruding body (58) may be dimensioned to be inserted within open end (16) such that outwardly protruding body (58) it slidable and rotatable relative to the respective inner surface (14) until the respective connecting body (10) and/or connecting joint (50) is suitably mechanically grounded. In other words, the interaction between outwardly protruding body (58) and a respective inner surface (14) may not alone inhibit motion between outwardly protruding body (58) and connecting body (10). This may help a user assembly connecting bodies (10) to various connecting joints (50) by hand.

Alternatively, outwardly protruding body (58) may be dimensioned to couple with open end (16) via an interference fit such that outwardly protruding body (58) may not substantially slide or rotate within open end (16) when connecting joint (50) suitably couples multiple connecting bodies (10). In other words, the interaction between outwardly protruding body (58) and a respective inner surface (14) may help inhibit motion between outwardly protruding body (58) and connecting body (10). A user may still be able to assemble connecting bodies (10) with connecting joints (50) by hand in order to accomplish the interference fit. Alternatively, a use may use a simple hammer or mallet in order to drive connecting joints (50) into an interference fit with connecting bodies (10).

Outwardly protruding body (58) may be dimensioned to provide a fluid tight seal between the exterior of outwardly protruding body (58) and inner surface (14) of connecting body (10) when suitably coupled.

Outwardly protruding body (58) may be permanently coupled within open end (16) of connecting body (10) using any suitable means as would be apparent to one skilled in the art in view of the teachings herein. For instance, an adhesive may be applied to an exterior of outwardly protruding body (58) or inner surface (14) of connecting body (10). Other possible connections may include thread, o-rings, sleeves, screws, protrusions that click into recessed portions of inner surface (14), etc.

Exterior surfaces (54) may be dimensioned to allow at least portion of a corresponding annular face (18) to abut against exterior surface (54) when connecting body (10) is suitably coupled with connecting joint (50). Therefore, exterior surface (54) may act as a "stop" for connecting bodies (10) such that base (52) of connecting joint (50) is not completely inserted into open end (16) of connecting body (10).

Connecting joint (50) may be formed of any suitable metal, plastic, rubber, resin, silicone, and/or wood as would be apparent to one skilled in the art in view of the teachings herein. Non-limiting examples of metals include aluminum, copper, iron, nickel, brass, steel, stainless, steel, titanium, etc. Non-limiting examples of plastics include thermoplastics such as acrylic, polypropylene, polystyrene, polythene and PVC. These plastics could also be reinforced with fillers such as glass and other filling agents. They could also be made out of thermosets. Also they could be made from composites such as nylon, acrylic, PVC and UPVC, and in addition, polythene, polypropylene, polycarbonate, epoxy resin, polyvinyl chloride and melamine.

Connecting joint (50) may be made from polypropylene injection molding. Other options for the use of plastics in manufacturing the (MIJ) could include 3D printing using ABS polycarbonate, which tends to be stronger and more durable than PLA filament. For added durability for outdoor conditions, adding UV to the ABS filament would provide extra protection. Another filament that could be used is PETG, which is extremely strong and durable.

Connecting joint (50) may be formed of an elastomeric material. Connecting joint (50) may be formed of wood. Connecting joint (50) may be formed of any suitable material as would be apparent to one skilled in the art in view of the teachings herein. Different portions of connecting joint (50) may be formed of different material. For example, base (52) may be formed of a more rigid material, while protruding body (58) may be formed of a more elastomeric material in order to form a fluid tight seal with inner surface (14) when suitably coupled. Different layers of material may be used, such as a rigid material layered with an elastomeric material.

In the current example, each exterior surface (54) includes a single outwardly protruding body (58) extending normally from respective surface (54). However, this is merely optional, any suitably number of outwardly protruding bodies (58) may extend form a single surface (54) as would be apparent to one skilled in the art in view of the teachings herein.

In the current example, base (52) includes planar exterior surfaces (54) in order to form a cube. However, this is merely optional, as base (52) may have any suitably shape, forming any suitably type of exterior surface (54), as would be apparent to one skilled in the art in view of the teachings herein. Additionally, exterior surfaces (54) do not need to be planar but may have any suitable curvature as would be apparent to one skilled in the art in view of the teachings herein.

The dimensions of connecting joint (50) and connecting bodies (10) may vary depending on the objective of the overall structure formed. For instance, the dimensioned of connecting joint (50) and connecting bodies (10) may be sized to suitably form a desired overall structure size, such as a large tent, a trellis dimensioned to accommodate the growth of a specific plant, or any other suitable objective as would be apparent to one skilled in the art in view of the teachings herein.

II. EXEMPLARY CONNECTING JOINTS HAVING ALTERNATIVE NUMBER OF NIPPLES

Figure 5:
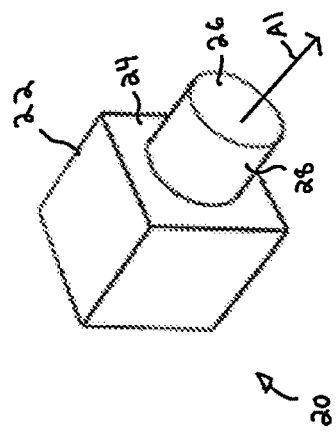
FIG. 5 depicts a perspective view of another exemplary connecting joint that may be readily incorporated with the connecting body of FIG. 1.

While connecting joint (50) includes six outwardly protruding bodies (58) (i.e., nipples) any suitable number of outwardly protruding bodies (58) (i.e., nipples) may be used in any suitable orientation. For example, as shown in FIG. 5, connecting joint (20), otherwise known as a "Single Plug—1 way," is substantially similar to connecting joint (50) described herein, with differences elaborated below. Connecting joint (20) includes a base (22) with exterior surfaces (24), which are substantially similar to base (52) and exterior surfaces (54) described herein. However, connecting joint (20) includes only one outwardly protruding body (28) with a terminating face (26) extending along a first axis (A1).

Figure 6:
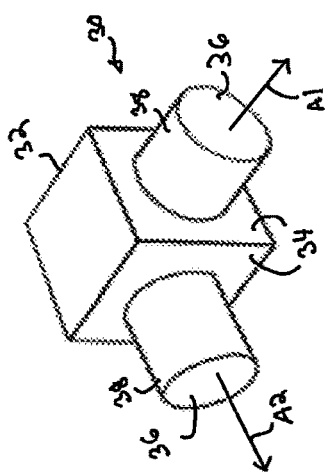
FIG. 6 depicts a perspective view of another exemplary connecting joint that may be readily incorporated with the connecting body of FIG. 1.

As shown in FIG. 6, connecting joint (30), otherwise known as a "Right Angle—2 way," is substantially similar to connecting joint (50) described herein, with differences elaborated below. Connecting joint (30) includes a base (32) with exterior surfaces (34), which are substantially similar to base (52) and exterior surfaces (54) described herein. However, connecting joint (30) includes two outwardly protruding bodies (38) with a terminating face (36), where one extends along a first axis (A1), and another extends along a second axis (A2).

Figure 7:
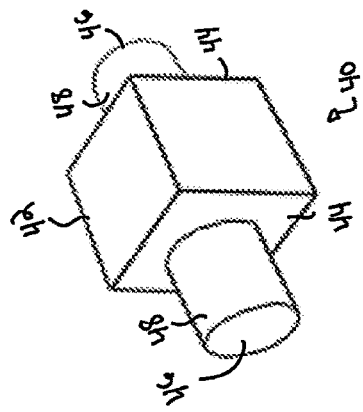
FIG. 7 depicts a perspective view of another exemplary connecting joint that may be readily incorporated with the connecting body of FIG. 1.

As shown in FIG. 7, connecting joint (40), otherwise known as a "Union-2 way," is substantially similar to connecting joint (50) described herein, with differences elaborated below. Connecting joint (40) includes a base (42) with exterior surfaces (44), which are substantially similar to base (52) and exterior surfaces (54) described herein. However, connecting joint (40) includes two outwardly protruding bodies (48) with a terminating face (46), where each protruding body (48) extends along the second axis (A2) in opposite directions.

Figure 8:
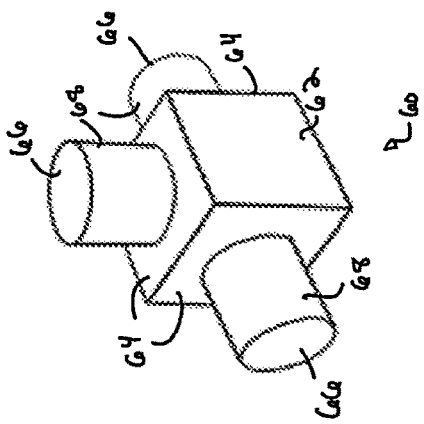
FIG. 8 depicts a perspective view of another exemplary connecting joint that may be readily incorporated with the connecting body of FIG. 1.

As shown in FIG. 8, connecting joint (60), otherwise known as a "T Split—3 way," is substantially similar to connecting joint (50) described herein, with differences elaborated below. Connecting joint (60) includes a base (62) with exterior surfaces (64), which are substantially similar to base (52) and exterior surfaces (54) described herein. However, connecting joint (60) includes three outwardly protruding bodies (68) with a terminating face (66), where two outwardly protruding bodies (68) extends along the second axis (A2) in opposite directions and a third body (68) extends long a third axis (A3).

Figure 9:
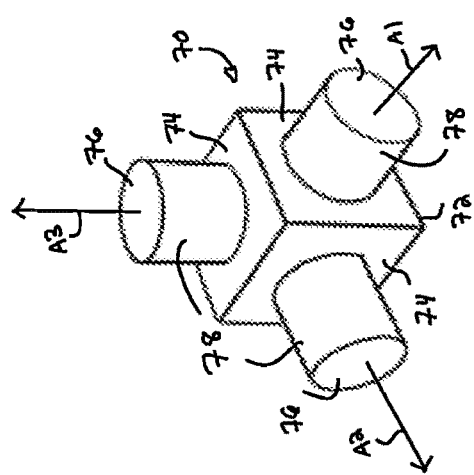
FIG. 9 depicts a perspective view of another exemplary connecting joint that may be readily incorporated with the connecting body of FIG. 1.

As shown in FIG. 9, connecting joint (70), otherwise known as a "Right Angle—3 way," is substantially similar to connecting joint (50) described herein, with differences elaborated below. Connecting joint (70) includes a base (72) with exterior surfaces (74), which are substantially similar to base (52) and exterior surfaces (54) described herein. However, connecting joint (70) includes three outwardly protruding bodies (78) with a terminating face (76), each extending along a different axis (A1, A2, A3) that are orthogonal relative to each other.

Figure 10:
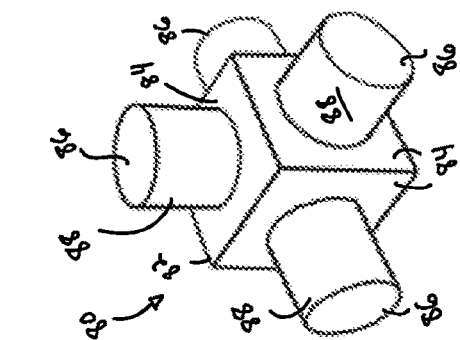
FIG. 10 depicts a perspective view of another exemplary connecting joint that may be readily incorporated with the connecting body of FIG. 1.

As shown in FIG. 10, connecting joint (80), otherwise known as a "Right Angle—4 way," is substantially similar to connecting joint (50) described herein, with differences elaborated below. Connecting joint (80) includes a base (82) with exterior surfaces (84), which are substantially similar to base (52) and exterior surfaces (54) described herein. However, connecting joint (80) includes three outwardly protruding bodies (88) with a terminating face (86), each extending along a different axis (A1, A2, A3) that are orthogonal relative to each other, and an additional outwardly protruding body extending along axis (A2).

Figure 11:
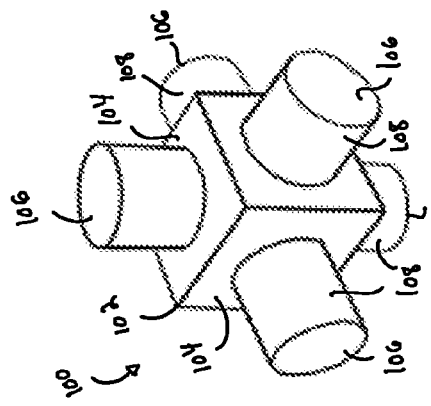
FIG. 11 depicts a perspective view of another exemplary connecting joint that may be readily incorporated with the connecting body of FIG. 1.

As shown in FIG. 11, connecting joint (90), otherwise known as a "Four Way Cross—4 way," is substantially similar to connecting joint (50) described herein, with differences elaborated below. Connecting joint (90) includes a base (92) with exterior surfaces (94), which are substantially similar to base (52) and exterior surfaces (54) described herein. However, connecting joint (90) includes two pairs of outwardly protruding bodies (98) with a terminating face (96), where a first pair of protruding bodies (98) extend along the second axis (A2) in opposite directions, and a second pair of protruding bodies (98) extend along the third axis (A3) in opposite directions.

Figure 12:
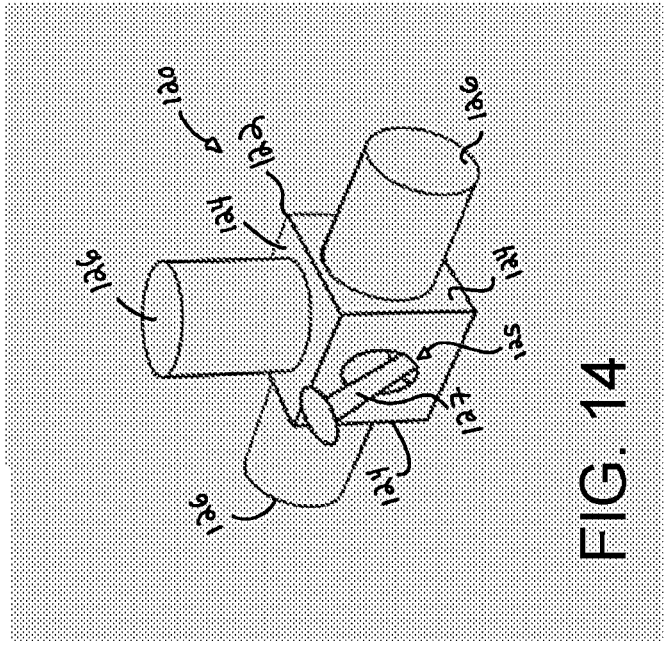
FIG. 12 depicts a perspective view of another exemplary connecting joint that may be readily incorporated with the connecting body of FIG. 1.

As shown in FIG. 12, connecting joint (100), otherwise known as a "Five Way Intersection—5 way," is substantially similar to connecting joint (50) described herein, with differences elaborated below. Connecting joint (100) includes a base (102) with exterior surfaces (104), which are substantially similar to base (52) and exterior surfaces (54) described herein. However, connecting joint (100) includes two pairs of outwardly protruding bodies (108) with a terminating face (106), where a first pair of protruding bodies (108) extend along the second axis (A2) in opposite directions, and a second pair of protruding bodies (108) extend along the third axis (A3) in opposite directions. Additionally, connecting joint (100) include a single protruding body (108) with a terminating face (106) extending along the first axis (A1).

III. EXEMPLARY CONNECTING JOINTS WITH ANCHORING FEATURES

Figure 13:
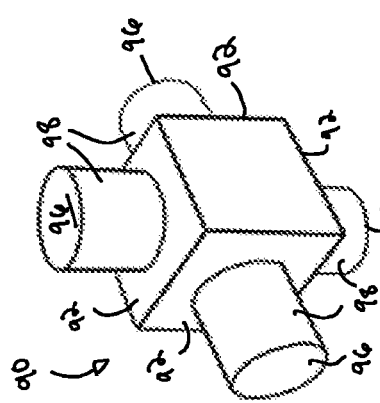
FIG. 13 depicts a perspective view of another exemplary connecting joint that may be readily incorporated with the connecting body of FIG. 1.
Figure 14:
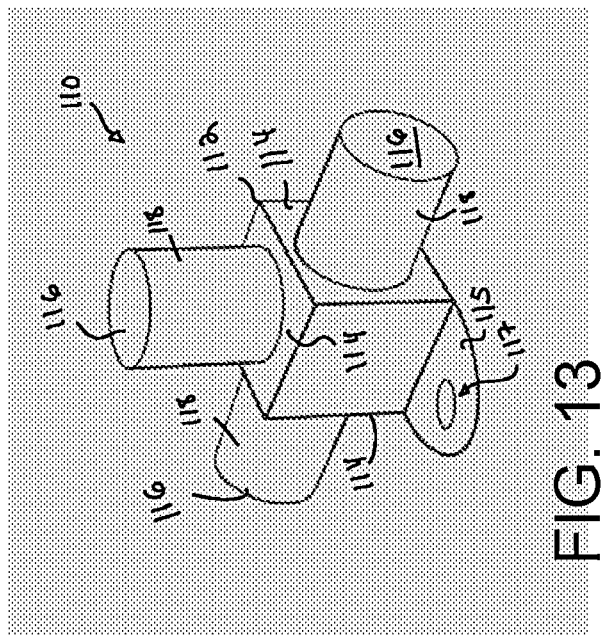
FIG. 14 depicts a perspective view of another exemplary connecting joint that may be readily incorporated with the connecting body of FIG. 1.

As shown in FIG. 13, connecting joint (110) is substantially similar to connecting joint (60) described above, with differences elaborated below. Connecting joint (110) includes base (112), exterior surfaces (114), protruding bodies (118), and terminating faces (116); which are substantially similar to base (62), exterior surfaces (64), protruding bodies (68), and terminating faces (66) described above, respectively. However, connecting joint (110) also includes an anchor extension (115) extending from an exterior surface (114) of base (112). Anchor extension (115) defines a through hole (117) dimensioned to receive an anchoring element (127) in order to help anchor connecting joint (110) to the ground. Any suitably anchoring element (127) may be used as would be apparent to one skilled in the art in view of the teachings herein. Connecting joint (110) may be used in order to help a structure (4, 6, 185) affix to the ground (G) in accordance with the description herein.

As shown in FIG. 13, connecting joint (120) is substantially similar to connecting joint (60) described above, with differences elaborated below. Connecting joint (120) includes base (122), exterior surfaces (124), protruding bodies (128), and terminating faces (126); which are substantially similar to base (62), exterior surfaces (64), protruding bodies (68), and terminating faces (66) described above, respectively. However, base (122) defines an anchor through hole (125) dimensioned to receive an anchoring element (127) in order to help anchor connecting joint (120) to the ground (G). Any suitably anchoring element (127) may be used as would be apparent to one skilled in the art in view of the teachings herein. Connecting joint (120) may be used in order to help a structure (4, 6, 185) affix to the ground (G) in accordance with the description herein.

IV. EXEMPLARY METHOD OF COUPLING CONNECTING BODIES WITH CONNECTING JOINTS TO FORM DESIRED STRUCTURE

Figure 16:
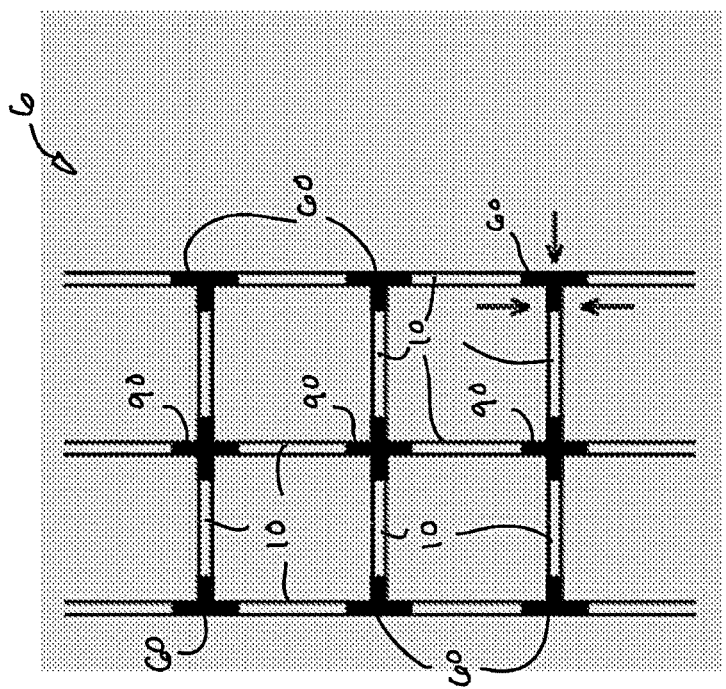
FIG. 16 depicts a top plan view of another exemplary structure that may be formed with a plurality of connecting joints of FIG. 8 and FIG. 11 and a plurality of connecting bodies of FIG. 1.

FIGS. 15-16 show various structures (4, 6) that may be formed from a combination of various connecting joints (20, 30, 40, 50, 60, 70, 80, 90, 100, 110, 120) and connecting bodies (10) described above. FIG. 15 shows an exemplary garden trellis (4) formed from connecting bodies (10) being coupled together by a combination of connecting joints (70, 80, 100) or a plurality of Six-Way connecting joints (50). Use of the Six-Way connecting joints (50) may make is easier to assembly structures (4, 6) as no specific orientation of connecting joints (50) would be required to form the desired structure (4, 6). Structure (4) may be used as a trellis.

In instances where connecting bodies (10) are equal length and made from PVC, the structure (4) would provide a strong and durable structure for the plants to grow on, with a nice, uniform, finished look with full functionality.

Connecting bodies (10) closest to the ground (G) include anchor structures (2) configured to suitably ground respective connecting bodies (10) into the ground (G) to support an exemplary structure (4). Anchor structures (2) may include the anchor connecting joints (110, 120) described above, the anchor connecting joint (190) described below in FIG. 29, a concrete footing buried in the ground to which one end of connecting bodies (10) are dipped into, or any other suitable anchoring structure (2) as would be apparent to one skilled in the art in view of the teachings herein.

A user may build on top of connecting bodies (10) closest to the ground to form structure (4) in accordance with the description below. For common usage, a kit could be made for gardeners to enjoy the benefits of growing plants and vegetables on trellises (4). This kit could include a suitable number of connecting joints (50) and connecting pipes (10) to easily construct a trellis (4) with simple instructions. More advanced trellises could also be requested or available. With access to the vast array of connecting joints in accordance with the description herein, the options of irrigation and various options of tubing, the skies (literally) the limit. Depending on the end users' desires, their trellis (4) could be custom made. It could be set up to different heights, make left or right turns, be irrigated, have different colors and so on. Different grades of kits could be marketed; the basic (non irrigated), the basic (irrigated), the advanced, or the custom.

Additionally, a user may build a structure such as a fence (6), as shown in FIG. 16, that is not already coupled with the ground (G), and then later affix the structure (6) to something else, or have the structure (6) be self-standing. Fence (6) could include connecting joints that promote right angle (or any other suitably angle) turns.

Figure 17B:
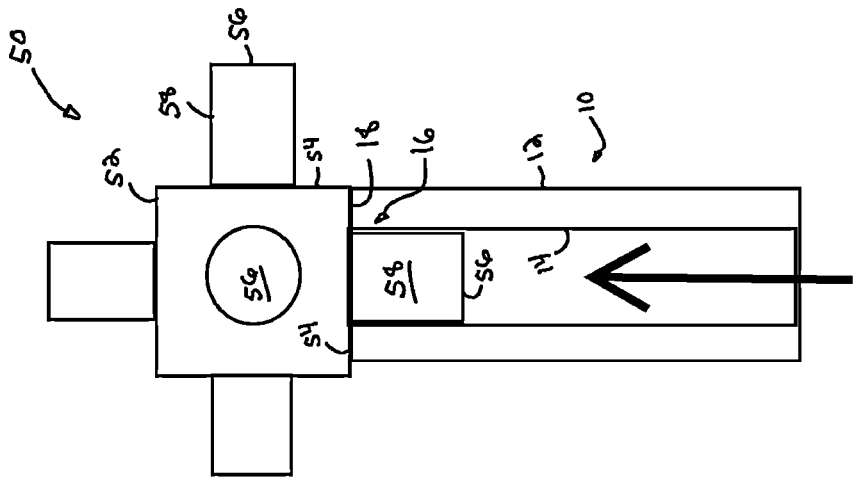
FIG. 17B depicts a cross-sectional view of the first connecting joint and the first connecting body of FIG. 17A suitably coupled with each other.
Figure 17A:
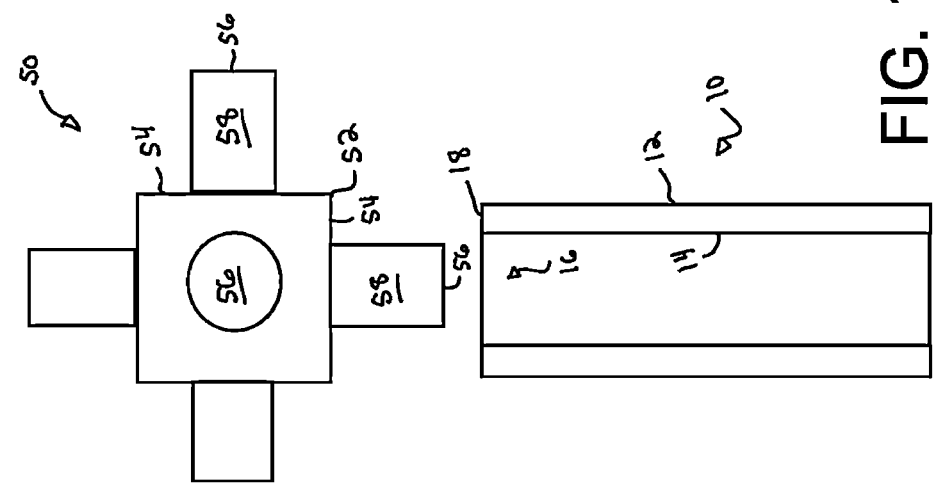
FIG. 17A depicts a cross-sectional view of a first connecting joint aligned with a first connecting body in preparation of coupling the first connecting joint with the first connecting body.

FIGS. 17A-17H show a suitable coupling of various coupling bodies (10) and coupling joints (50) in order to form a desired structure. As shown in FIG. 17A, a user may align an outwardly protruding body (58) of a first connecting joint (50) with an open end (16) of a first connecting body (10). Next, as shown in FIG. 17B, the user may push connecting joint (50) toward connecting body (10), or vice versa, such that outwardly protruding body (58) aligned with open end (16) is inserted within the confines of open end (16), thereby coupling the first connecting joint (50) with the first connecting body (10). First connecting joint (50) and first connecting body (10) may be coupled utilizing any technique or structure described herein.

Figures 17C, 17D:
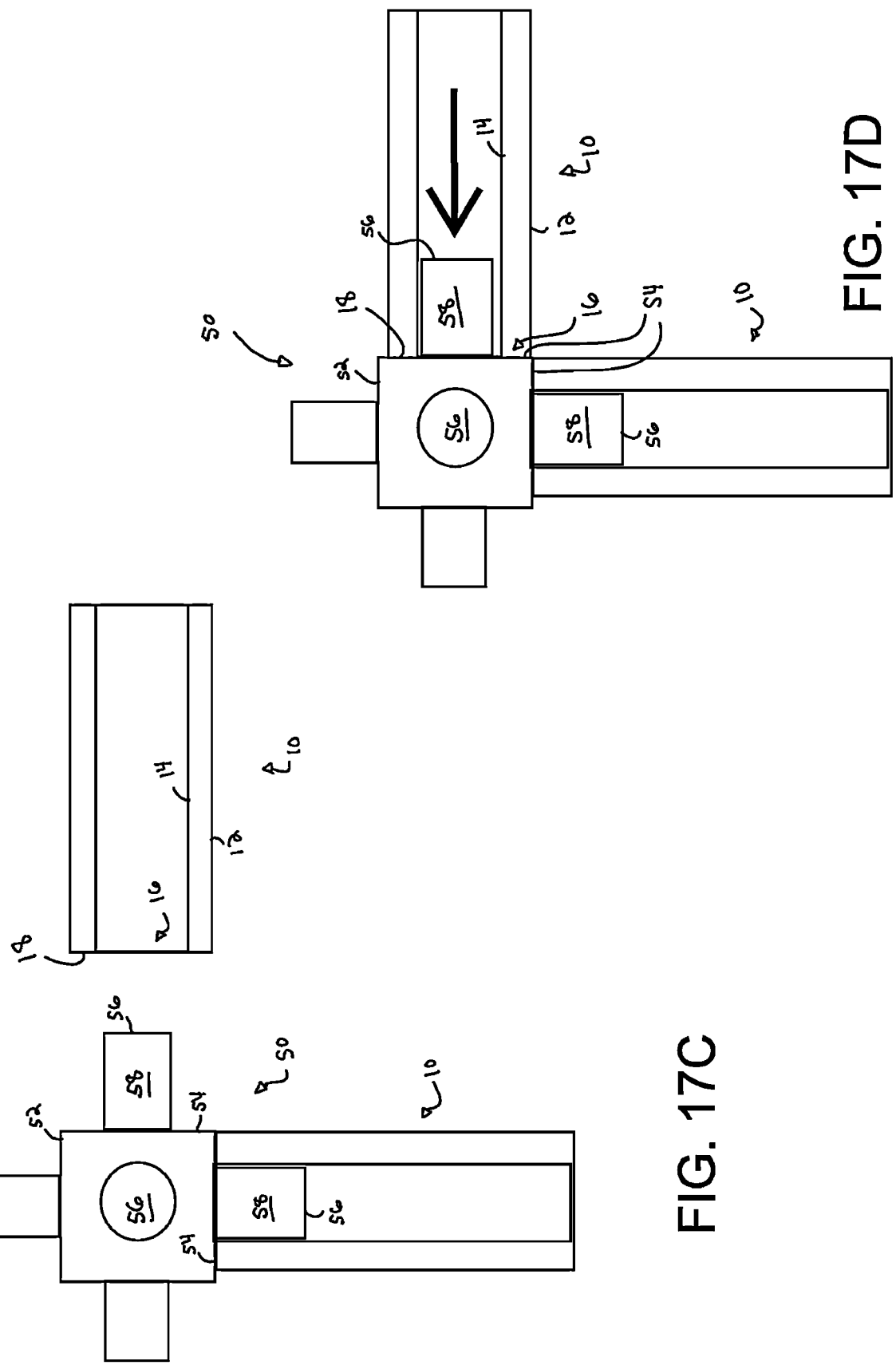
FIG. 17C depicts a cross-sectional view of the first connecting joint of FIG. 17A coupled with the first connecting body of FIG. 17A, where a second connecting body is aligned with the first connecting body in preparation of coupling the second connecting body with the first connecting joint.
FIG. 17D depicts a cross-sectional view of the first connecting joint of FIG. 17A coupled with the first connecting body FIG. 17A and the second connecting body of FIG. 17C.

Next, as shown in FIG. 17C, the user may align a second outwardly protruding body (58) of the first connecting joint (50) with an open end (16) of a second connecting body (10). Next, as shown in FIG. 17D, the user may push the first connecting joint (50) toward the second connecting body (10), or vice versa, such that outwardly protruding body (58) aligned with open end (16) of the second connected body (10) is inserted within the confines of open end (16), thereby coupling the first connecting joint (50) with the second connecting body (10). First connecting joint (50) and second connecting body (10) may be coupled utilizing any technique or structure described herein.

Figure 17E:
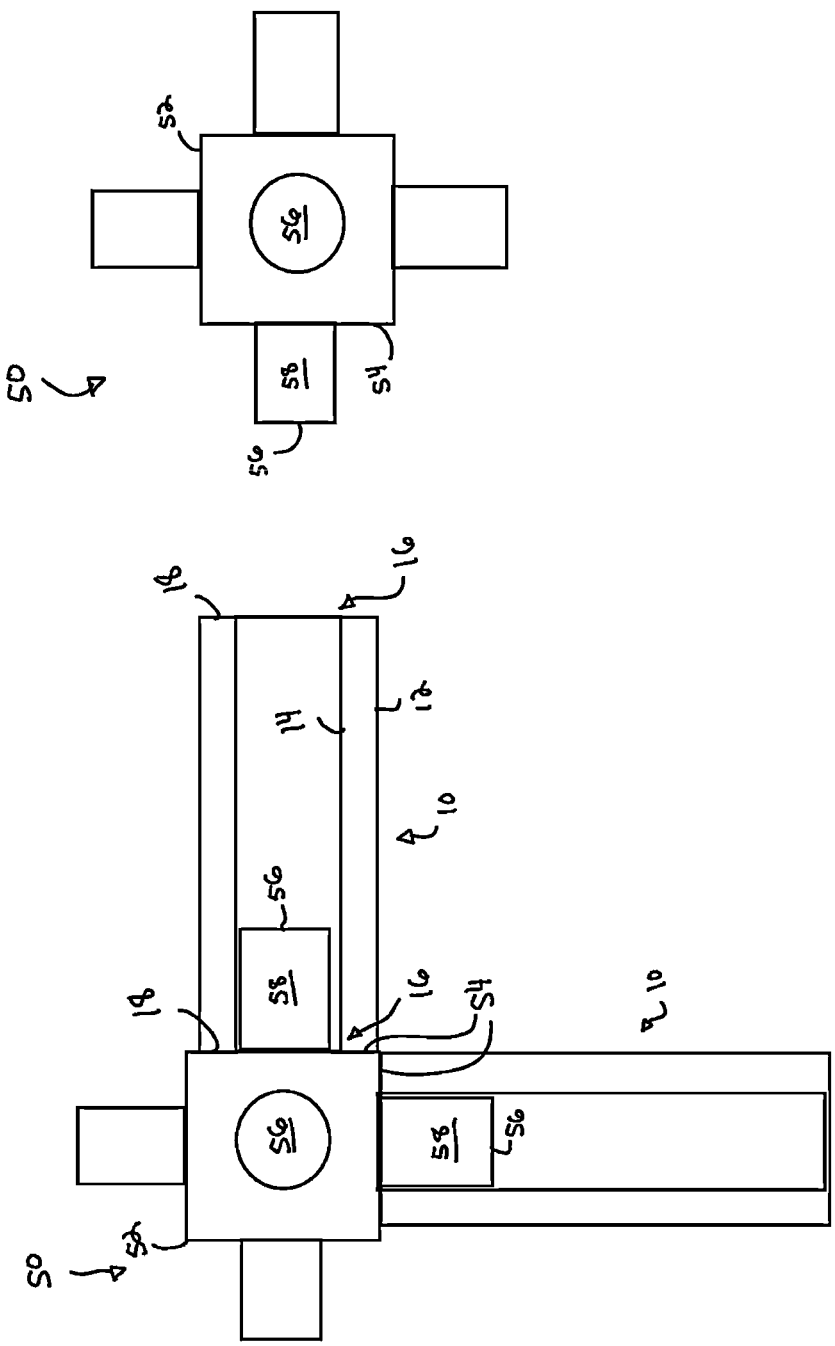
FIG. 17E depicts a cross-sectional view of the first connecting joint of FIG. 17A coupled with both the first connecting body of FIG. 17A and the second connecting body of FIG. 17C, where a second connecting joint is aligned with the second connecting body in preparation of coupling the second connecting joint with the second connecting body.
Figure 17F:
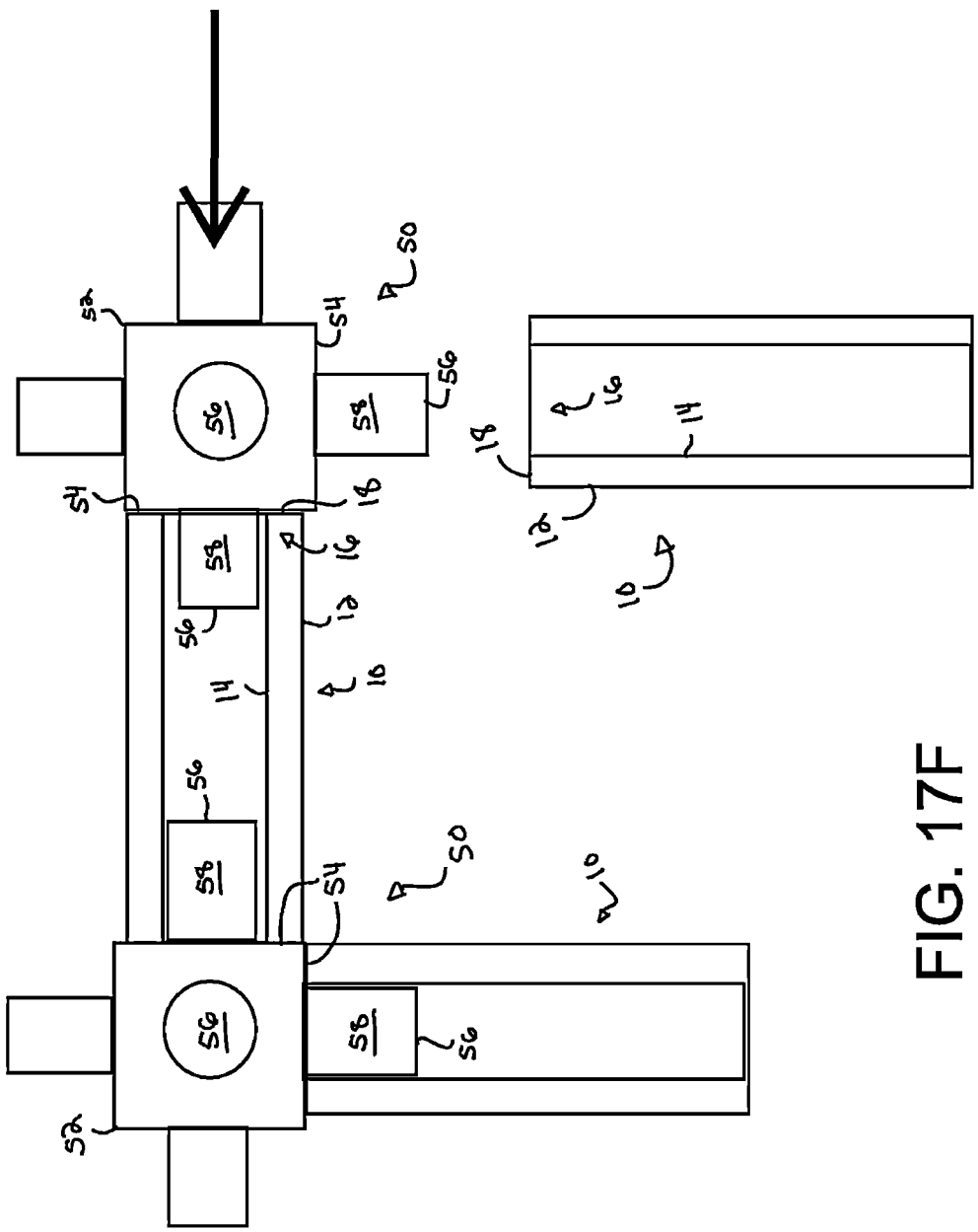
FIG. 17F depicts a cross-sectional view of the first connecting joint of FIG. 17A coupled with both the first connecting body of FIG. 17A and the second connecting body of FIG. 17C, where the second connecting joint of FIG. 17E is coupled with the second connecting body, where a third connecting body is aligned with the second connecting body in preparation of coupling the second connecting joint with the third connecting body.

Next, as shown in FIG. 17E, the user may align a second connecting joint (59) with the opposite open end (16) of the second connecting body (10). Next, as shown in FIG. 17F the user may push the second connecting joint (50) toward the second connecting body (10), or vice versa, such that outwardly protruding body (58) aligned with open end (16) of the second connected body (10) is inserted within the confines of open end (16), thereby coupling the second connecting joint (50) with the second connecting body (10). Second connecting joint (50) and second connecting body (10) may be coupled utilizing any technique or structure described herein.

Figure 17G:
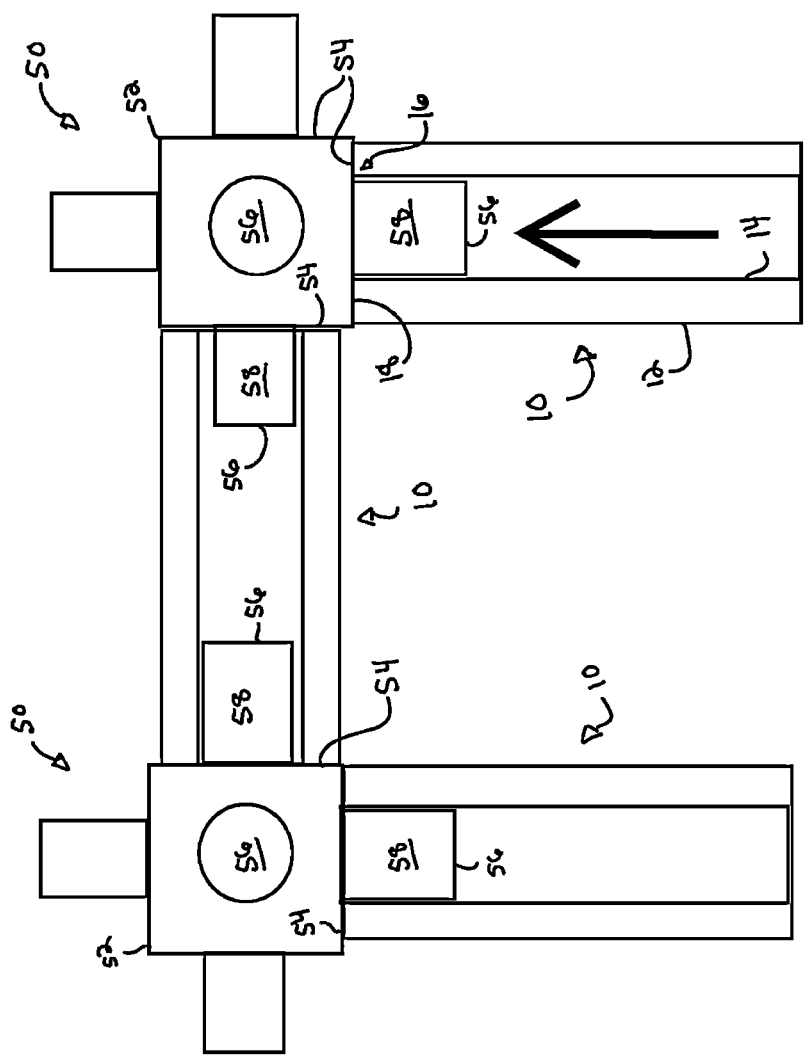
FIG. 17G depicts a cross-sectional view of the first connecting joint of FIG. 17A coupled with the first body of FIG. 17A and the second connecting body of FIG. 17C, and the second connecting joint of FIG. 17E coupled with the second connecting body and the third connecting body of FIG. 17F.

Next, as also shown in FIG. 17F, the user may align the second connecting joint (59) with an open end (16) of a third connecting body (10). Next, as shown in FIG. 17G the user may push the second connecting joint (50) toward the third connecting body (10), or vice versa, such that outwardly protruding body (58) aligned with open end (16) of the third connected body (10) is inserted within the confines of open end (16), thereby coupling the second connecting joint (50) with the third connecting body (10). Second connecting joint (50) and third connecting body (10) may be coupled utilizing any technique or structure described herein.

Figure 17H:
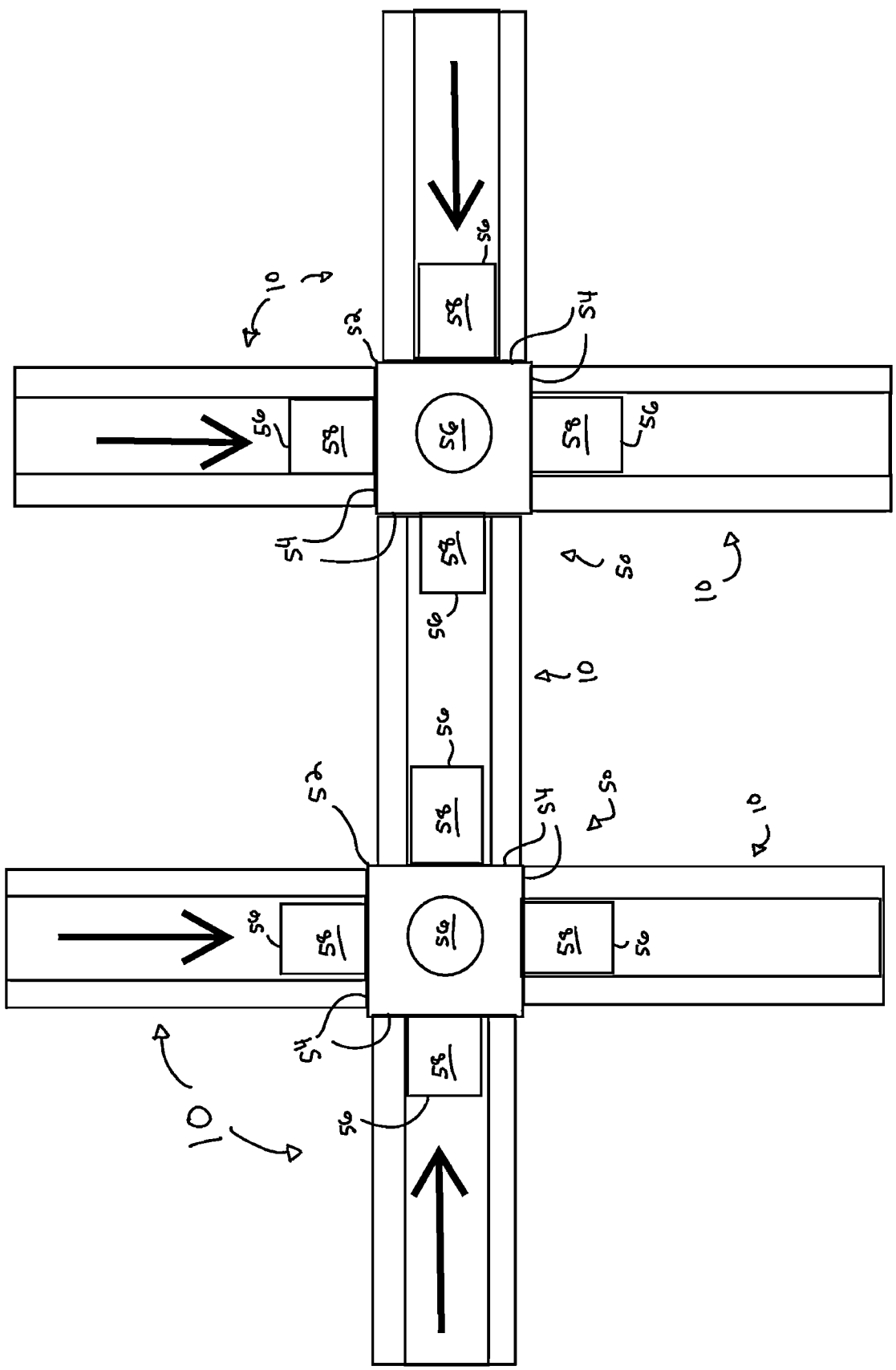
FIG. 17H depicts a cross-sectional view of the first connecting joint of FIG. 17A coupled with the first body of FIG. 17A and the second connecting body of FIG. 17C, and the second connecting joint of FIG. 17E coupled with the second connecting body and the third connecting body of FIG. 17F, where additionally connecting bodies are attached to the first and second connecting joint.

Further as shown in FIG. 17H, the user may attach any other suitable number of connecting bodies (10) to connecting joints (50) in other to form the desired structure (4, 6). It should be understood that the user may couple connecting bodies (10) to any suitable outwardly protruding body (58) of joint (50) such that the connecting bodies (10) form any suitable angle/structure desired by the user. Therefore, the user may use connecting joints (50) to interact with the inner surface (14) of connecting bodies (10) in order to form any suitable structure desired by the user.

V. EXEMPLARY CONNECTING JOINT WITH INTERNAL FLUID PATHWAYS

As mentioned above, some connecting bodies (10) are hollowed out such that open ends (16) are in fluid communication with each other. In some instances, it may be desirable to pump fluid through various connecting bodies (10) of a structure via the inner surface (14) and open ends (16). For instance, in the example of a garden trellis, it may be desirable to provide a selected path of irrigation in order to water plants growing on or near the trellis.

Figure 18:
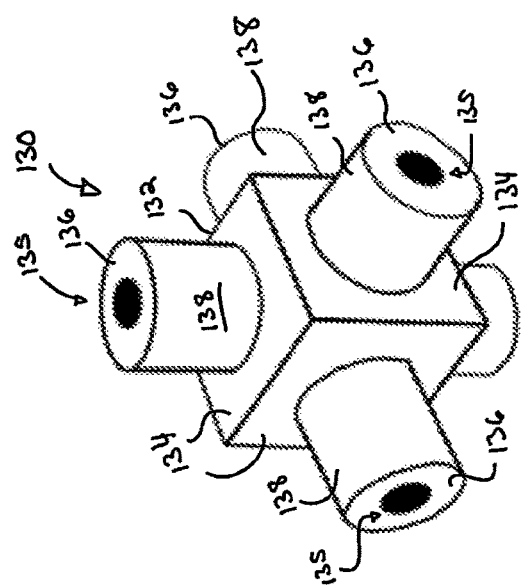
FIG. 18 depicts a perspective view of an alternative connecting joint defining a fluid pathway.
Figure 19:
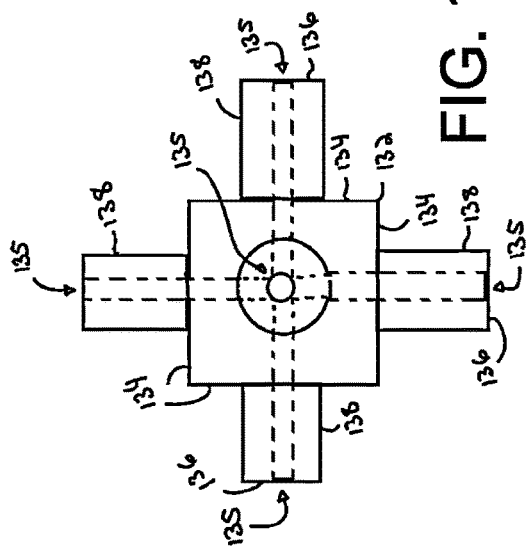
FIG. 19 depicts an elevational front view of the connecting joint of FIG. 18.

Connecting joint (130) in FIG. 18 may be used to provide fluid communication through various connecting bodies (10) forming a structure. Connecting joint (130) may be substantially similar to other connecting joints described herein. Therefore, connecting joint (130) includes a base (132), a plurality of exterior faces (134), and a plurality of outwardly protruding bodies (138) each having a terminating face (136); which may be substantially similar to base (52), exterior faces (54), protruding bodies (58) each having a terminating face (56) described above, respectively, with differences elaborated below.

Terminating faces (136) each define a fluid pathway (135) that extend through outwardly protruding bodies (138) into base (152) such that each fluid pathway (135) located at a respective terminating face (136) is in fluid communication with one another. Therefore, when connecting joint (130) is suitably coupled with connecting bodies (10), fluid may flow through the inner surface (14) of connecting body, through fluid pathway (135), and into an adjacent inner surface (14) of an adjacent connecting body (10). Fluid pathway (135) may have varying cross-sectional dimensions to create different degrees of pressure at different portions of pathway (135).

In the current example, each terminating face (136) defines a fluid pathway (135) and each fluid pathway (135) are in fluid communication with each other via a single fluid communication line. However, both are merely optional. For instance, only a select number of terminating faces (136) may include a fluid pathway (135) such that fluid pathway (135) runs a predetermined course between predetermined connecting bodies (10). In other words, fluid pathway (135) may help define a custom fluid-line along predetermined connecting bodies (10), such as the top of a trellis.

Additionally, there may be multiple fluid pathways (135) within a single connecting joint (130) for different types of fluids to flow along different paths defined by different connecting bodies (10). For instance, one fluid pathway may be designated for water to run through, while another fluid pathway may be designated for liquid plant food, pesticides, or any other suitable fluid to run through as would be apparent to one skilled in the art in view of the teachings herein.

Connecting bodies (10) may be further modified which holes from inner surface (14) to outer surface (12) such that fluid communication to the inner surface (14) of connecting body (10) may then be expelled to adjacent plant life or any other object. Connecting bodies (10) may include hose connections, sprinklers, etc. in order to pump fluid into structures formed by connecting body (10) and expel such fluid toward adjacent plant life.

Other irrigation/watering possibilities could, for example, include using flexible water tubing clipped to the top or throughout the trellis (4). Any number of possibilities could be done to irrigate the plants this way; spray heads, holes in the tubing or drip hoses. A water volume control system, such as a timer attached to the water inlet system could also be employed.

VI. EXEMPLARY CONNECTING JOINT WITH TAPERED NIPPLE

As mentioned above, outwardly protruding body (58) may be dimensioned to provide an interference fit and/or a fluid tight seal with open end (16) of connecting body when suitably coupled in accordance with the description herein. Additionally, as mentioned above, outwardly protruding body (58) may be configured to suitably couple with various dimensioned inner surfaces (14) of a variety of coupling bodies (10).

Figure 20:
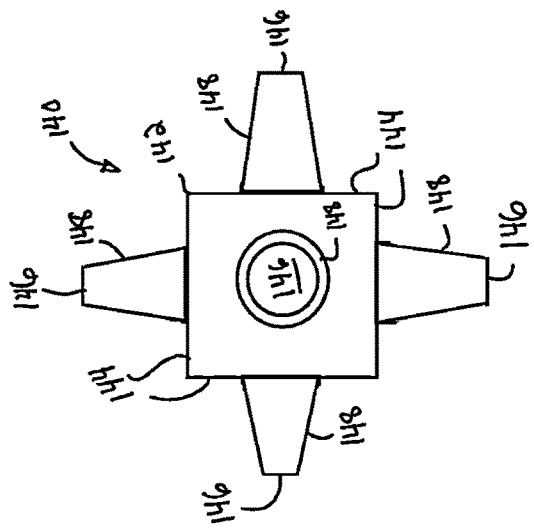
FIG. 20 depicts a perspective view of an alternative connecting joint having tapered outward protruding bodies.

FIG. 20 shows an exemplary connecting joint (140) configured to couple with open end (16) via an interference fit, a fluid tight seal, or couple with multiple open ends (16) of various dimensions. Connecting joint (140) may be substantially similar to other connecting joints described herein. Therefore, connecting joint (140) includes a base (142), a plurality of exterior faces (144), and a plurality of outwardly protruding bodies (148) each having a terminating face (146); which may be substantially similar to base (52), exterior faces (54), protruding bodies (58) each having a terminating face (56) described above, respectively, with differences elaborated below.

In particular, outwardly protruding bodies (148) are tapered such that once bodies (148) extend within open end (16) a predetermined length, a portion of the tapered exterior may abut against inner surface (14) of connecting body (10). This tapered nature of outwardly protruding bodies (148) may allow connecting joint (140) to suitably couple with various connecting bodies (10) having a varying inner diameter defined by inner surface (14). Additionally, this tapered nature of outwardly protruding bodies (148) may allow connecting joint (140) to couple with connecting bodies (10) via an interference fit or a fluid tight seal. While in the current example, the tapered nature of outwardly protruding bodies (148) has a substantially linear profile, this is merely optional. For instances, outwardly protruding bodies (148) may include a change is cross-sectional geometry that followers a curved profile, a barbed profile, an undulating profile, or any other suitably profile as would be apparent to one skilled in the art in view of the teachings herein.

Outwardly protruding bodies (148) may be made of a rigid material, a pliable material, a deformable material, an elastomeric material, or any other suitable material that would be apparent to one skilled in the art in view of the teachings herein.

VII. EXEMPLARY CONNECTING JOINTS FOR CONNECTING BODIES HAVING VARYING CROSS-SECTIONAL GEOMETRIES

Figure 21:
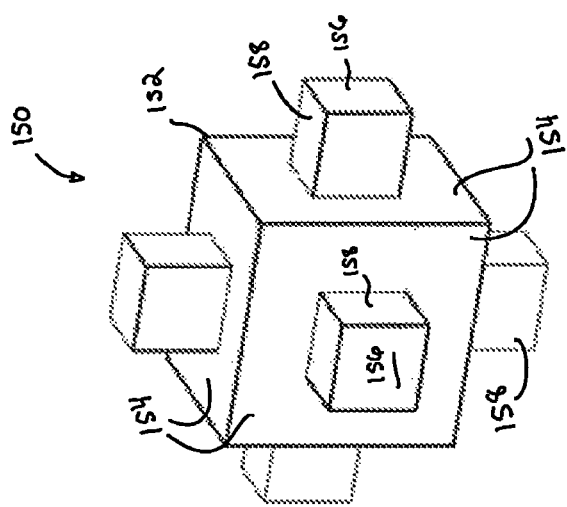
FIG. 21 depicts a perspective view of an alternative connecting joint.

As also mentioned above, connecting body (10) having a hollow rectangular shape, or any other suitably shape that would be apparent to one skilled in the art in view of the teaching herein. FIG. 21 shows a connecting joint (150) configured to mate with a connecting body (10) having a hollow rectangular shape. Connecting joint (150) may be substantially similar to other connecting joints described herein. Therefore, connecting joint (150) includes a base (152), a plurality of exterior faces (154), and a plurality of outwardly protruding bodies (158) each having a terminating face (156); which may be substantially similar to base (52), exterior faces (54), protruding bodies (58) each having a terminating face (56) described above, respectively, with differences elaborated below.

Figure 22:
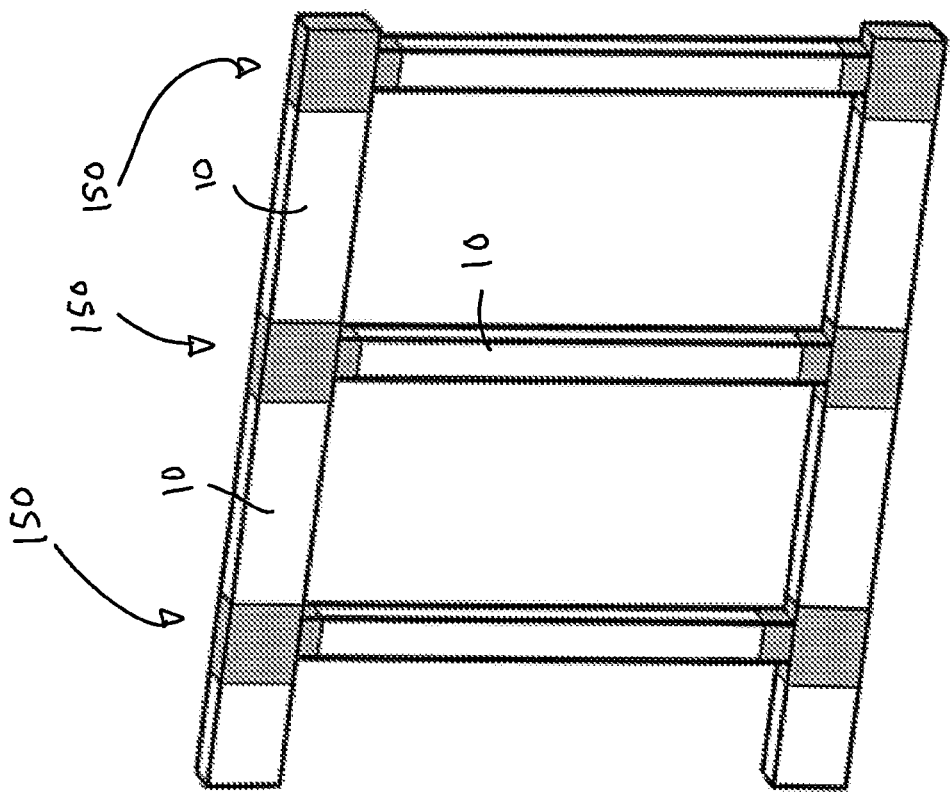
FIG. 22 depicts a perspective view of the connecting joint of FIG. 21 forming a fence or a wall structure.

In particular, outwardly protruding bodies (158) are rectangular in shape, rather than cylindrically shaped. Therefore, outwardly protruding bodies (158) may couple with connecting bodies (10) having a hollow rectangular shape as shown in FIG. 22. The hollow rectangular shape of connecting bodies (10) shown in FIG. 22 may be used to form a fence, a wall, or any other suitably structure as would be apparent to one skilled in the art in view of the teachings herein. Vertical connecting bodies (10) may be spaced 16 inches, similar to studs in a wall. It should be understood that outwardly protruding bodies (158) may be modified in shape to compliment any geometry of the recessed area of connecting body (10).

Using squared connecting joint (150) and prefabricated squared lengths for horizontal and vertical sections, construction personal could build walls and partitions quickly and easily by connecting the pieces together without having to measure or guess. Other connecting joint (150) could be used to create left or right turns or various angles depending on the design. This could easily be constructed to code by using straights of sixteens, including the width of the connecting joint (150). By using the connecting joint (150) square connectors with square straights attached to them, drywall or other paneling could easily be applied to the square, flush surface. The ease of construction is exemplified by simply joining sixteen-inch sections together with the height to create a desired wall.

VIII. EXEMPLARY CONNECTING JOINTS TO FORM STRUCTURES WITH CUSTOM ANGLES

As mentioned above, when connecting bodies (10) are suitably coupled with connecting joints (50), connecting bodies (10) will extend lengthwise along a respective axis (A1, A2, A3) defined by outwardly protruding bodies (58), which may therefore determine the overall shape formed by connecting bodies (10) and connecting joints (50) when suitably coupled. As also mentioned above, axis (A1, A2, A3) of connecting joints (50) are orthogonal relative to each other. In some instances, it may be desirable to couple connecting bodies (10) along axis other than those that are orthogonal such that connecting bodies (10) may form other angles relative to each other, thereby forming other structures.

Figure 23:
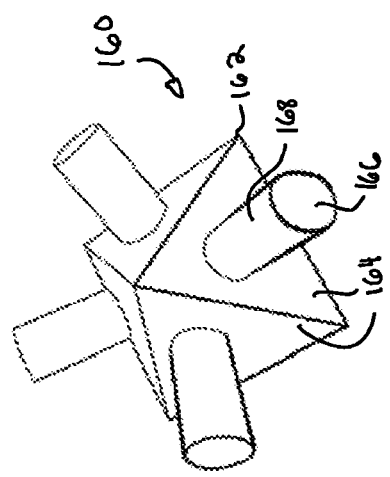
FIG. 23 depicts a perspective view of an alternative connecting joint.
Figure 24:
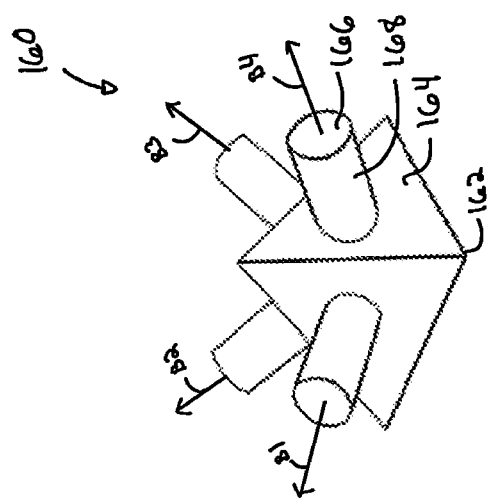
FIG. 24 depicts another perspective view of the connecting joint of FIG. 23.

FIGS. 23-24 shows a connecting joint (160) used to couple connecting bodies (10) are alternative custom angles relative to each other. Connecting joint (160) may be substantially similar to other connecting joints described herein. Therefore, connecting joint (160) includes a base (162), a plurality of exterior faces (164), and a plurality of outwardly protruding bodies (168) each having a terminating face (166); which may be substantially similar to base (52), exterior faces (54), protruding bodies (58) each having a terminating face (56) described above, respectively, with differences elaborated below.

Exterior faces (164) of base (162) form a rectangular pyramid instead of the cube shown for base (52) described above. Outwardly protruding bodies (168) extend from a respective exterior face (164) along different axis (B1, B2, B3, B4) such that when connecting bodies (10) attach to outwardly protruding bodies (168), connecting bodies (10) form angles relative to each other defines by axis (B1, B2, B3, B4). These angles may be used to form custom structures. Therefore, axis (B1, B2, B3, B4) may also be modified to such that connecting bodies (10) form a desired structure when assembled in accordance with the description herein.

Figure 25:
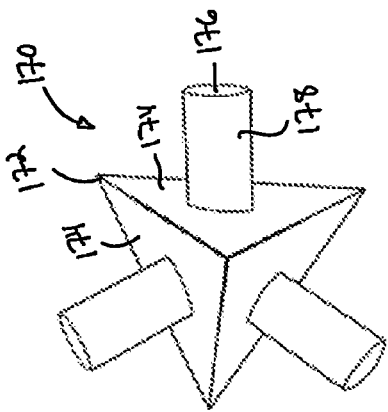
FIG. 25 depicts a perspective view of an alternative connecting joint.
Figure 26:
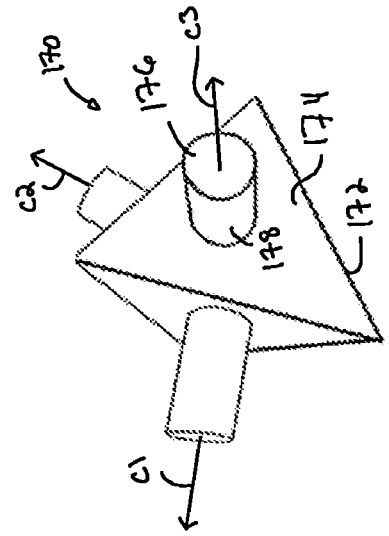
FIG. 26 depicts another perspective view of the connecting joint of FIG. 25.

FIGS. 25-26 shows a connecting joint (170) used to couple connecting bodies (10) are alternative custom angles relative to each other. Connecting joint (170) may be substantially similar to other connecting joints described herein. Therefore, connecting joint (170) includes a base (172), a plurality of exterior faces (174), and a plurality of outwardly protruding bodies (178) each having a terminating face (176); which may be substantially similar to base (52), exterior faces (54), protruding bodies (58) each having a terminating face (56) described above, respectively, with differences elaborated below.

Exterior faces (174) of base (172) form a triangular pyramid instead of the cube shown for base (52) described above. Outwardly protruding bodies (178) extend from a respective exterior face (174) along different axis (C1, C2, C3) such that when connecting bodies (10) attach to outwardly protruding bodies (178), connecting bodies (10) form angles relative to each other defines by axis (C1, C2, C3). These angles may be used to form custom structures. Therefore, axis (C1, C2, C3) may also be modified to such that connecting bodies (10) form a desired structure when assembled in accordance with the description herein.

Bases (162, 172) and exterior surfaces (164, 174) may form any suitably geometry such that outwardly protruding bodies (168, 178) define axis to form any suitably structure as would be apparent to one skilled in the art in view of the teachings herein.

Figure 28:
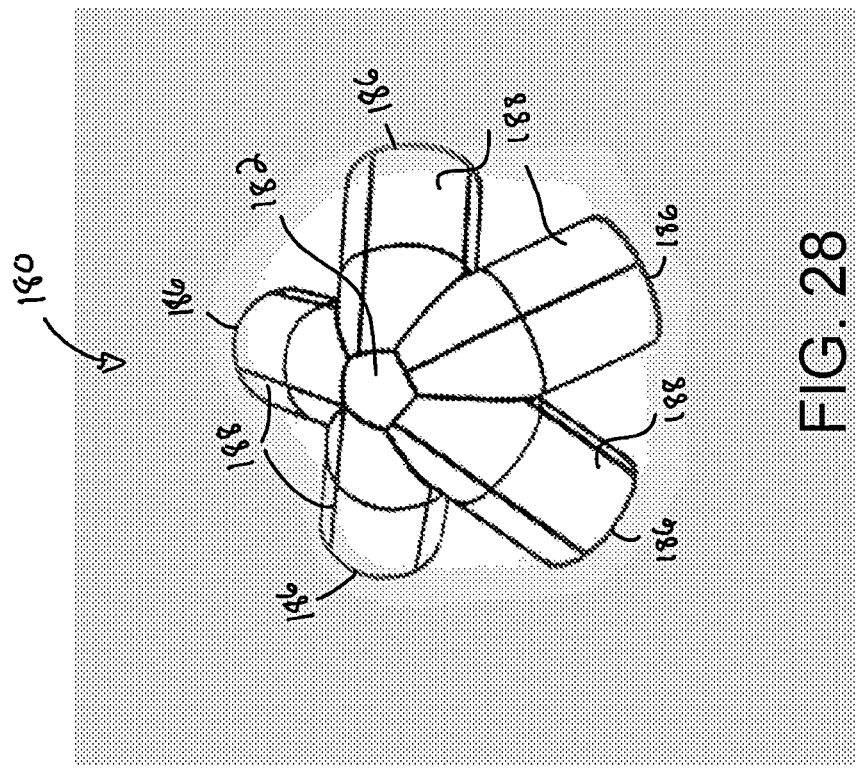
FIG. 28 depicts a perspective view of an exemplary connecting joint used to form the structure of FIG. 27.
Figure 27:
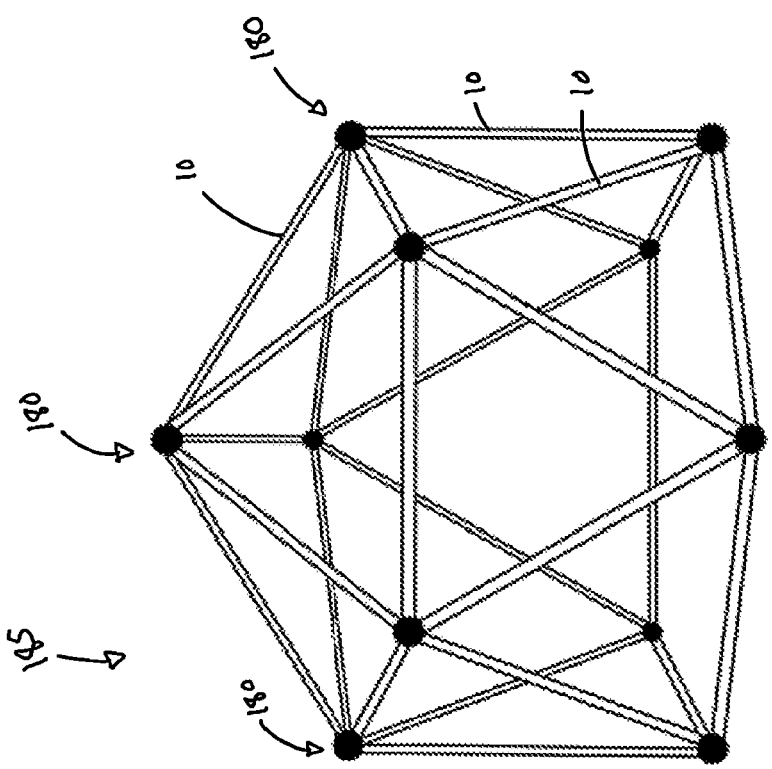
FIG. 27 depicts a perspective view of another structure that may be formed with a connecting joint and connecting bodies.

FIG. 28 shows a connecting joint (180) used to couple connecting bodies (10) at alternative custom angles relative to each other. In particular, connecting joint (180) may be used to form the structure (185) shown in FIG. 27. Connecting joint (180) may be substantially similar to other connecting joints described herein. Therefore, connecting joint (180) includes a base (182), and a plurality of outwardly protruding bodies (188) each having a terminating face (186); which may be substantially similar to base (52), and protruding bodies (58) each having a terminating face (56) described above, respectively, with differences elaborated below.

Five outwardly protruding bodies (188) extend from base (182) in such a manner that when connecting bodies couple with outwardly protruding bodies (188) in accordance with the description herein, the structure formed is an icosahedron hemisphere (185), which represents fifteen sides of a twenty-sided icosahedron. The uses of this type of structure could be numerous. Ranging from backyard art to creating coverings or frames to store items or protect from the sun or rain.

Figure 30:
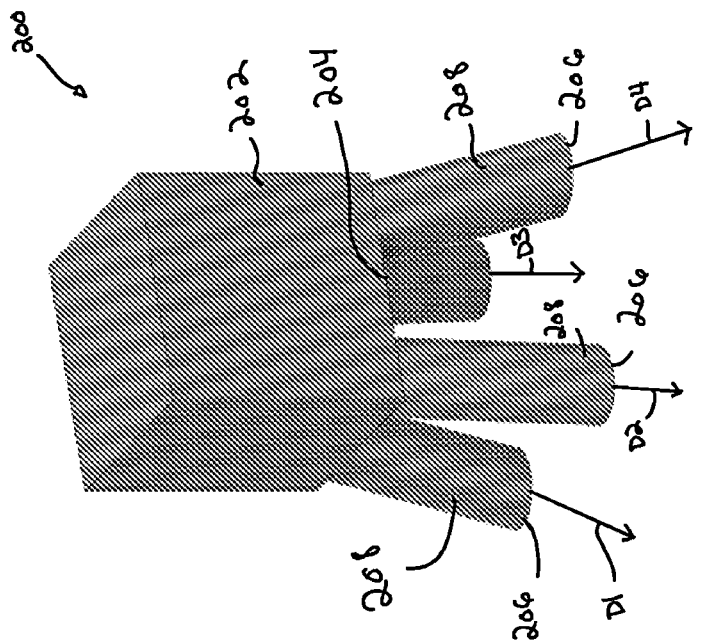
FIG. 30 depicts a perspective view of a connecting joint configured to couple with a plurality of connecting bodies to form a teepee structure.

FIG. 30 shows a connecting joint (200) used to couple connecting bodies (10) are alternative custom angles relative to each other. Connecting joint (200) may be substantially similar to other connecting joints described herein. Therefore, connecting joint (200) includes a base (202), a plurality of exterior faces (204), and a plurality of outwardly protruding bodies (208) each having a terminating face (206); which may be substantially similar to base (52), exterior faces (54), protruding bodies (58) each having a terminating face (56) described above, respectively, with differences elaborated below.

Outwardly protruding bodies (208) extend from the same exterior face (204) along different axis (D1, D2, D3, D4). These axis (D1, D2, D3, D4) are aligned such that when connecting bodies (10) couple with outwardly protruding bodies (208), a tepee structure is formed. One such application for such a structure could be a teepee garden trellis used for climbing plants in a vegetable garden. These plants can include poles beans, lima beans, peas, tomatoes, squash, gourds, peppers, melons and more. Other usages for teepee like structures could be for ornamental and esthetic and even fun purposes. Using indiginous plants for the area and planting them around the teepee one can create stunning outdoor appeal and a potential fun zone for kid and adults.

Figure 29:
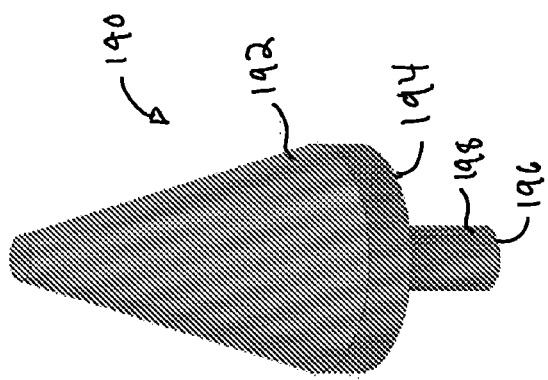
FIG. 29 depicts a perspective view of a connecting joint configured to anchor a connecting body in the ground.

FIG. 29 shows a connecting joint (190) used to couple to a connecting body (10) in order to turn one end of connecting body (10) into a grounding end configured to puncture the ground (G). Connecting joint (190) is substantially similar to connecting joint (20), described above, with differences elaborated below. Therefore, connecting joint (190) includes a base (192) with exterior surfaces (194), and a single outwardly protruding body (198) and terminating face (196), which are substantially similar to base (22), exterior surfaces (24), outwardly protrudin body (28), and terminating face (26) described herein, respectively, with differences elaborated below.

In particular, base (192) terminates into a tip configured to puncture the ground. Therefore, when connecting joint (190) is coupled with a connecting body (10), the user may push connecting joint (190) into the ground in order to anchor connecting body (10), creating a solid base for the structure to sit upon. A fitting such as this allows for the trellis to be stable and strong in its footprint in the ground.

Any base described above may have any suitable geometric shape to form any suitable structure when combined with connecting bodies (10) as would be apparent to one skilled in the art in view of the teachings herein. For instance, a base may have a structure similar to a block with a rectangular pyramid extending from the block, with outwardly protruding bodies (i.e., nipples) extending from any suitable surface as would be apparent to one skilled in the art in view of the teachings herein.

IX. OTHER POTENTIAL USES FOR CONNECTING JOINTS

There could be many other potential uses for the various connecting joints described herein (MIJ). One such application would be using (MIJ) connectors to create frames for roofs and awnings. Using this concept, frames could be made to support fabrics, tarps, plastics and other forms of sun, wind and rain protectors.

An example of this could be a portable outdoor hunting shelter. Using the six sided connecting joint (50), a shell could be easily constructed with tubing and tarps, fabrics, plastics to surround it. If rivets were placed strategically in the tarp/fabric then the exposed nipples (58) on the outer sides of the connecting joint (50) could be used to hold the tarp/fabric in place. In the case of an outdoor portable hunting structure, the connecting joint (50) could be easily used to support a canvas/tarp to allow for a lightweight solution for this application.

In this concept, the application of the connecting joint (50) (or any other connecting joint) to secure tarps/fabrics/plastics/etc. opens up a plethora of other possibilities. These could include tent or canopy like structures that one might see at festivals and fairs. For instance, a connecting joint could, for strength purposes, be made of metal and have a hole going thru the sides of the nipple to allow for a cotter pin or a circular ring to hold the tarp/fabric in place.

Other similar ideas could include the usage of the Connecting Joint (20, 30, 40, 50, 60, 70, 80, 90, 100, 110, 120, 130, 140, 150, 160, 170, 180, 190, 200) after pouring concrete or the like. When inclement weather might be arriving, a protective covering raised over the concrete could save the project from being ruined.

Another possible usage of the Connecting Joint (20, 30, 40, 50, 60, 70, 80, 90, 100, 110, 120, 130, 140, 150, 160, 170, 180, 190, 200) could be in the area of frost prevention of trees and shrubs. Constructing structures using the Connecting Joint (20, 30, 40, 50, 60, 70, 80, 90, 100, 110, 120, 130, 140, 150, 160, 170, 180, 190, 200) or its embodiments could allow for the saving of blooming trees and shrubs during harsh weather and temperatures. By creating a tent, teepee or greenhouse like structure, valuable fruits and other flowering plants could be saved.

Another possible usage of the Connecting Joint (20, 30, 40, 50, 60, 70, 80, 90, 100, 110, 120, 130, 140, 150, 160, 170, 180, 190, 200) could be in the area of creating barriers for privacy and property lines. Using Connecting Joint (20, 30, 40, 50, 60, 70, 80, 90, 100, 110, 120, 130, 140, 150, 160, 170, 180, 190, 200) fittings, one could create barriers that vine like plants could climb on. For instance, if a property owner wanted to edge out their property line to create privacy and didn't want to build a fence, they could use Connecting Joint (20, 30, 40, 50, 60, 70, 80, 90, 100, 110, 120, 130, 140, 150, 160, 170, 180, 190, 200) fittings to build a double wall that indigenous vine like plants could climb on. Creating a double wall, or two essentially single linear sides connected, yet separated by, for instance six inches, one could create a hedge like barrier that could be aesthetically pleasing and extremely functional at the same time. There is a term used for this concept that is called a "fedge." A fence made up of living plants and somewhat resembling a hedge.

Using this concept, many other applications of the Connecting Joint (20, 30, 40, 50, 60, 70, 80, 90, 100, 110, 120, 130, 140, 150, 160, 170, 180, 190, 200) could come into play. In addition to the description of garden trellises (4), using Connecting Joint (20, 30, 40, 50, 60, 70, 80, 90, 100, 110, 120, 130, 140, 150, 160, 170, 180, 190, 200) could be used to create other structures for supporting vine like plants are numerous. Arbors, gazebos, pergolas, grottos, lattices are just some of the possibilities of things and structures that could be created by using the Connecting Joint (20, 30, 40, 50, 60, 70, 80, 90, 100, 110, 120, 130, 140, 150, 160, 170, 180, 190, 200) fittings.

Another possible usage of the Connecting Joint (20, 30, 40, 50, 60, 70, 80, 90, 100, 110, 120, 130, 140, 150, 160, 170, 180, 190, 200) could be for creating display and backdrop support for artwork and photography. One could use Connecting Joint (20, 30, 40, 50, 60, 70, 80, 90, 100, 110, 120, 130, 140, 150, 160, 170, 180, 190, 200) fittings to create areas for such displays with canvases or even create a photo shot area using green screen.

Another possible usage of the Connecting Joint (20, 30, 40, 50, 60, 70, 80, 90, 100, 110, 120, 130, 140, 150, 160, 170, 180, 190, 200) would be in the concept of fort and play yard usages for kids and adults. Using Connecting Joint (20, 30, 40, 50, 60, 70, 80, 90, 100, 110, 120, 130, 140, 150, 160, 170, 180, 190, 200) fittings to make forts and other fun structures are other examples of the usage of the Connecting Joint (20, 30, 40, 50, 60, 70, 80, 90, 100, 110, 120, 130, 140, 150, 160, 170, 180, 190, 200).

X. EXEMPLARY COMBINATIONS

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A kit for forming a gardening structure, the kit comprising (a) a plurality of connecting bodies comprising: (i) a first connecting body comprising a first open end, (ii) a second connecting body comprising a second open end, and (iii) a third connecting body extending between a third open end and a fourth open end; and (b) a plurality of connecting joints, comprising: (i) a first connecting joint, comprising: (A) a first base, (B) a first extending body extending from the first base along a first axis, wherein the first extending body is dimensioned to fit within the first open end of the first connecting body thereby coupling the first connecting joint with the first connecting body, and (C) a second extending body extending from the first base along a second axis, wherein the second extending body is dimensioned to fit within the third open end of the third connecting body thereby coupling the first connecting joint with the third connecting body, wherein the first axis and the second axis intersect with each other, and (ii) a second connecting joint, comprising: (A) a second base, (B) a third extending body extending from the second base, wherein the third extending body is dimensioned to fit within the second open end of the second connecting body thereby coupling the second connecting joint with the second connecting body, and (C) a fourth extending, wherein the fourth extending body is dimensioned to fit within the fourth open end of the third connecting body thereby coupling the second connecting joint with the third connecting body.

Example 2

The kit of Example 1, wherein the third extending body of the second connecting joint extends along a third axis, wherein the fourth extending body of the second connecting joint extends along a fourth axis, wherein the third axis and the fourth axis intersect with each other.

Example 3

The kit of any one or more of Examples 1 through 2, wherein the first axis and the second axis define a right angle.

Example 4

The kit of any one or more of Examples 1 through 3, wherein the first axis and the second axis define an oblique angle.

Example 5

The kit of any one or more of Examples 1 through 4, wherein the plurality of connecting bodies comprise a plurality of tubular bodies.

Example 6

The kit of Example 5, wherein the first base comprises a cube, wherein the first extending body comprises a first cylinder, wherein the second extending body comprises a second cylinder.

Example 7

The kit of Example 6, wherein the first cylinder and the second cylinder comprise
the same diameter.

Example 8

The kit of any one or more of Examples 6 through 7, wherein the first cylinder and the second cylinder are tapered to create a seal with the first tubular body and the second tubular body, respectively.

Example 9

The kit of any one or more of Examples 1 through 8, wherein the gardening structure comprises either a trellis or a fence.

Example 10

The kit of any one or more of Examples 1 through 9, wherein the first connecting joint defines a hollowed-out passageway extending through the first extending body, the base, and the second extending body.

Example 11

The kit of Example 10, wherein at least one of the connecting bodies comprises a plurality of holes configured to provide irrigation in conjunction with the hollowed-out passageway.

Example 12

A kit for forming a gardening structure, the kit comprising: (a) a plurality of connecting bodies comprising: (i) a first connecting body comprising a first open end, and (ii) a second connecting body comprising a second open end; (b) at least one connecting joint comprising a first connecting joint, wherein the first connecting joint comprises: (i) a first base, (ii) a first extending body extending from the first base along a first axis, wherein the first extending body is dimensioned to fit within the first open end of the first connecting body thereby coupling the first connecting joint with the first connecting body, and (iii) a second extending body extending from the first base along a second axis, wherein the second extending body is dimensioned to fit within the second open end of the second connecting body thereby coupling the first connecting joint with the second connecting body, wherein the first axis and the second axis intersect with each other.

Example 13

The kit of Example 12, wherein the first connecting joint further comprises a third extending body extending from the first base.

Example 14

The kit of Example 13, wherein the third extending body extends along the second axis.

Example 15

The kit of any one or more of Examples 13 through 14, wherein the third extending body extends along a third axis that intersects with both the first axis and the second axis.

Example 16

The kit of any one or more of Examples 13 through 15, wherein the first connecting joint further comprises a fourth extending body extending from the first base.

Example 17

The kit of Example 16, wherein the first connecting joint further comprise a fifth extending body extending from the first base.

Example 18

The kit of Example 17, wherein the first connecting joint further comprises a sixth extending body extending from the first base.

Example 19

The kit of Example 18, wherein the base comprises a cube, wherein each extending body extends from a respective face of the cube.

Example 20

A connecting joint, the connecting joint comprising: (a) a base, comprising a first surface, a second surface, a third surface, a fourth surface, a fifth surface, and a sixth surface; (b) a first extending body extending from the first surface of the base along a first axis, wherein the first extending body is dimensioned to fit within an open end of a connecting body such that the first extending body is configured to couple the connecting joint with the connecting body; (c) a second extending body extending from the second surface of the base along the first axis, wherein the second extending body is dimensioned to fit within the open end of the connecting body such that the second extending body is configured to couple the connecting joint with the connecting body; (d) a third extending body extending from the third surface of the base along a second axis, wherein the third extending body is dimensioned to fit within the open end of the connecting body such that the third extending body is configured to couple the connecting joint with the connecting body; (e) a fourth extending body extending from the fourth surface of the base along the second axis, wherein the fourth extending body is dimensioned to fit within the open end of the connecting body such that the fourth extending body is configured to couple the connecting joint with the connecting body; (f) a fifth extending body extending from the fifth surface of the base along a third axis, wherein the fifth extending body is dimensioned to fit within the open end of the connecting body such that the fifth extending body is configured to couple the connecting joint with the connecting body; and (g) a sixth extending body extending from the sixth surface of the base along the third axis, wherein the sixth extending body is dimensioned to fit within the open end of the connecting body such that the sixth extending body is configured to couple the connecting joint with the connecting body.

IV. MISCELLANEOUS

It should also be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A method of using a kit to form a gardening structure, the method comprising:
   (a) inserting a first outwardly protruding body of a first connecting joint into a top open end of a first connecting body such that a cube base of the first outwardly protruding body abuts against a first annular face of the first connecting body;
   (b) inserting a second outwardly protruding body of a second connecting joint into a top open end of a second connecting body such that a cube base of the second outwardly protruding body abuts against a top annular face of the second connecting body;
   (c) coupling the first connecting joint and the second connecting joint with a lateral connecting body;
   (d) inserting an outwardly protruding body of a first anchoring joint into a bottom open end of the first connecting body via a first interference fit;
   (e) inserting an outwardly protruding body of a second anchoring joint into a bottom end of the second connecting body via a second interference fit;
   (f) anchoring either the first anchoring joint or the second anchoring joint into the ground;
   (g) allowing a plant to grow on the gardening structure such that the gardening structure is a trellis; and
   (h) irrigating fluid between an interior of the lateral connecting body and an interior of the first connecting body via a fluid pathway defined by at least the cube base and the first connecting body of the first connecting joint in order to water the plant.

2. The method of claim 1, wherein the base of the first connecting joint and the first outwardly protruding body completely cover the top end of the first connecting body.

3. The method of claim 2, wherein the first outwardly protruding body is slidably housed within the top open end of the first connecting body after being inserted into the top open end of the first connecting body.

4. The method of claim 2, wherein the first outwardly protruding body is inserted into the top open end of the first connecting body with an interference fit.

5. The method of claim 1, wherein the first anchoring joint comprises an anchor extension, wherein anchoring either the first anchoring joint or the second anchoring joint into the ground comprises driving an anchoring feature through the anchor extension and into the ground.

6. The method of claim 1, wherein the first anchoring joint comprises an anchor base defining an anchoring through hole, wherein anchoring either the first anchoring joint or the second anchoring joint into the ground comprises driving an anchoring feature through the anchoring through hole and into the ground.

7. The method of claim 1, wherein the lateral coupling body comprises a first open end and a second open end, wherein coupling the first connecting joint and the second connecting joint with a lateral connecting body comprises inserting the first open end into a lateral outwardly protruding body of the first connecting joint and inserting the second open end into a lateral outwardly protruding body of the second connecting joint.

8. The method of claim 1, wherein the first connecting joint comprises a total of six outwardly protruding bodies.

9. The method of claim 8, wherein the base comprises a total of six planar surfaces attached to a respective outwardly protruding body of the six outwardly protruding bodies.

10. A method of using a kit to form a gardening structure, the method comprising:
   (a) inserting a first outwardly protruding body of a first connecting joint into a top open end of a first connecting body such that a terminating face of the first outwardly protruding body extends across an inner surface of the first connecting body defining the top open end and a cube base of the first connecting joint abuts against a first annular face of the first connecting body;
   (b) inserting a second outwardly protruding body of a second connecting joint into a top open end of a second connecting body such that a terminating face of the second outwardly protruding body extends across an inner surface of the second connecting body defining the top open end and a cube case of the second connecting joint abuts against a top annular face of the second connecting body;
   (c) coupling the first connecting joint and the second connecting joint with a lateral connecting body;
   (d) inserting an outwardly protruding body of a first anchoring joint into a bottom open end of the first connecting body via a first interference fit;
   (e) inserting an outwardly protruding body of a second anchoring joint into a bottom end of the second connecting body via a second interference fit;
   (f) anchoring either the first anchoring joint or the second anchoring joint into the ground;
   (g) allowing a plant to grow on the gardening structure such that the gardening structure forms a trellis; and
   (h) irrigating fluid between an interior of the lateral connecting body and an interior of the first connecting body via a fluid pathway defined by at least the cube base and the first outwardly protruding body in order to water the plant.

11. The method of claim 10, wherein the first outwardly protruding body is attached via an interference fit to the first connecting body after being inserted into the top open end of the first connecting body.

12. The method of claim 10, wherein the first outwardly protruding body is rotatably relative to the first connecting body after being inserted into the top open end of the first connecting body.

13. The method of claim 10, wherein the first connecting body and the second connecting body extend vertically from the ground.

14. The method of claim 10, further comprising inserting a third outwardly protruding body of the first connecting joint into a bottom open end of a third connecting body such that the first connecting body and the third connecting body extend along a common vertical axis.

15. The method of claim 14, wherein the first anchoring joint defines an anchoring through hole.

16. The method of claim 14, wherein the first anchoring joint comprises a base from which the outwardly protruding body extends from.

17. A method of using a kit to form a gardening structure, the method comprising:
  (a) inserting a first outwardly protruding body of a first connecting joint into a top open end of a first connecting body such that the first outwardly protruding body of the first connecting joint and a cube base of the first connecting joint fill the top open end of the first connecting body;
  (b) inserting a second outwardly protruding body of a second connecting joint into a top open end of a second connecting body such that the second outwardly protruding body of the second connecting joint and a cube base of the first connecting joint fill the top open end of the second connecting body;
  (c) coupling the first connecting joint and the second connecting joint with a lateral connecting body;
  (d) inserting an outwardly protruding body of a first anchoring joint into a bottom open end of the first connecting body via a first interference fit;
  (e) inserting an outwardly protruding body of a second anchoring joint into a bottom end of the second connecting body via a second interference fit;
  (f) anchoring either the first anchoring joint or the second anchoring joint into the ground;
  (g) allowing a plant to climb the gardening structure such that the gardening structure consists of a trellis; and
  (h) irrigating fluid between an interior of the lateral connecting body and an interior of the first connecting body via a fluid pathway defined by at least the cube base of the first connecting joint and the first connecting body.

18. The method of claim 17, wherein the outwardly protruding body of the first anchoring joint terminates within the bottom open end of the first connecting body.

19. The method of claim 18, wherein the outwardly protruding body of the second anchoring joint terminates within the bottom open end of the second connecting body.

* * * * *